(12) United States Patent
Park et al.

(10) Patent No.: US 9,360,943 B2
(45) Date of Patent: Jun. 7, 2016

(54) DISPLAY DEVICE AND METHOD OF PROVIDING FEEDBACK FOR GESTURES THEREOF

(75) Inventors: Soungsoo Park, Seoul (KR); Sangki Kim, Seoul (KR); Yongwon Cho, Seoul (KR); Soungmin Im, Seoul (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 13/995,093

(22) PCT Filed: Dec. 27, 2010

(86) PCT No.: PCT/KR2010/009355
§ 371 (c)(1),
(2), (4) Date: Jun. 17, 2013

(87) PCT Pub. No.: WO2012/091185
PCT Pub. Date: Jul. 5, 2012

(65) Prior Publication Data
US 2013/0265226 A1    Oct. 10, 2013

(51) Int. Cl.
*G09G 5/00*      (2006.01)
*G06F 3/01*      (2006.01)
*H04N 21/4223*   (2011.01)
*H04N 21/439*    (2011.01)
*H04N 21/44*     (2011.01)
*H04N 21/442*    (2011.01)
*H04N 21/482*    (2011.01)
*H04N 21/485*    (2011.01)

(52) U.S. Cl.
CPC ............ *G06F 3/017* (2013.01); *H04N 21/4223* (2013.01); *H04N 21/439* (2013.01); *H04N 21/44008* (2013.01); *H04N 21/44218* (2013.01); *H04N 21/482* (2013.01); *H04N 21/485* (2013.01)

(58) Field of Classification Search
CPC ............ G06F 3/017; H04N 21/44218; H04N 21/439; H04N 21/44008; H04N 21/482; H04N 21/4223; H04N 21/48
See application file for complete search history.

(56) References Cited

U.S. PATENT DOCUMENTS

| | | | |
|---|---|---|---|
| 2009/0191968 A1* | 7/2009 | Johnson et al. | 463/37 |
| 2009/0196461 A1 | 8/2009 | Iwamoto | |
| 2010/0277411 A1* | 11/2010 | Yee et al. | 345/156 |
| 2010/0302015 A1* | 12/2010 | Kipman et al. | 340/407.1 |
| 2012/0001856 A1* | 1/2012 | Davidson | 345/173 |

FOREIGN PATENT DOCUMENTS

| | | |
|---|---|---|
| KP | 10-0855003 B1 | 8/2008 |
| KR | 10-2009-0084727 A | 8/2009 |
| KR | 10-2010-0032699 A | 3/2010 |
| KR | 10-2010-0129629 A | 12/2010 |

* cited by examiner

*Primary Examiner* — Matthew Sim
(74) *Attorney, Agent, or Firm* — Birch, Stewart, Kolasch & Birch, LLP

(57) ABSTRACT

An image display device is provided. The image display device comprises a speaker, a camera for receiving a user's gesture, and a controller for outputting sound of the speaker to the user's position. Thereby, feedback for a gesture of the image display device can be efficiently provided.

16 Claims, 17 Drawing Sheets

Fig. 1
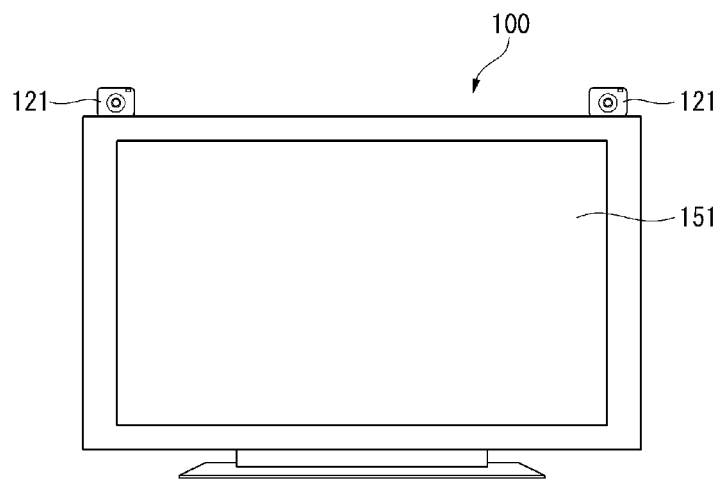
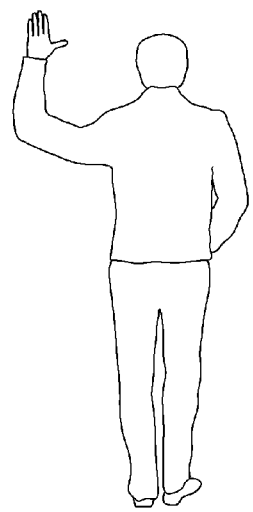

Fig. 7

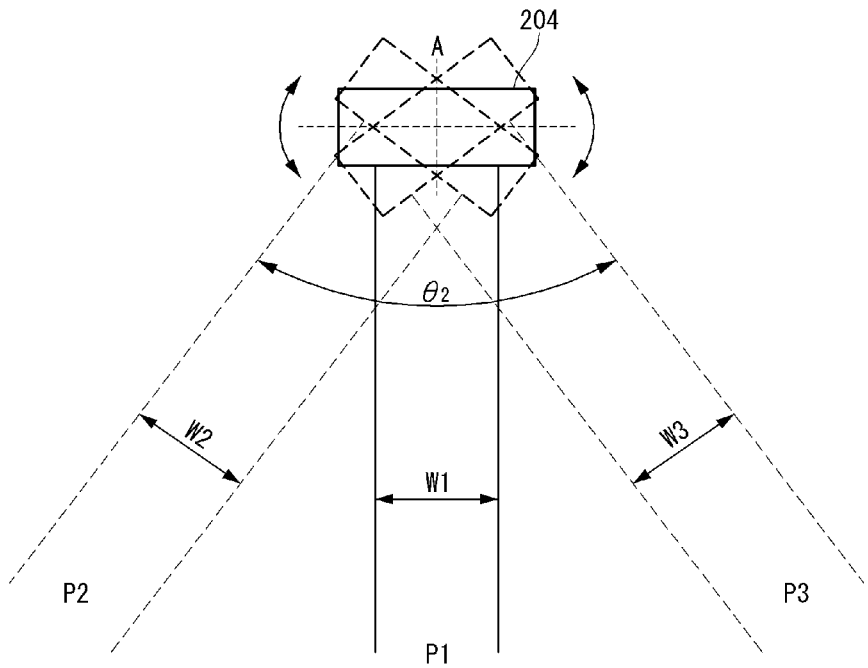

Fig. 8

| Gesture | | Gesture Command | Feedback Audio |
|---|---|---|---|
| Waving Gesture | ← 🖐 → | Turn on the TV (Start) | First Audio |
| Horizontal Waving Gesture | ← 🖐 → | show the channel change menu | Second Audio |
| Circling Gesture | ↻ 🖐 ↻ | Change the channel | Third Audio |
| Vertical Waving Gesture | ↕ 🖐 | Show the volume control menu | Second Audio |
| Circling Gesture | ↻ 🖐 ↻ | Control the volume | Third Audio |
| Pushing Gesture | 🖐 → 🖐 | Select (or exucute) a channel (a program) | Fourth Audio |

Fig. 13
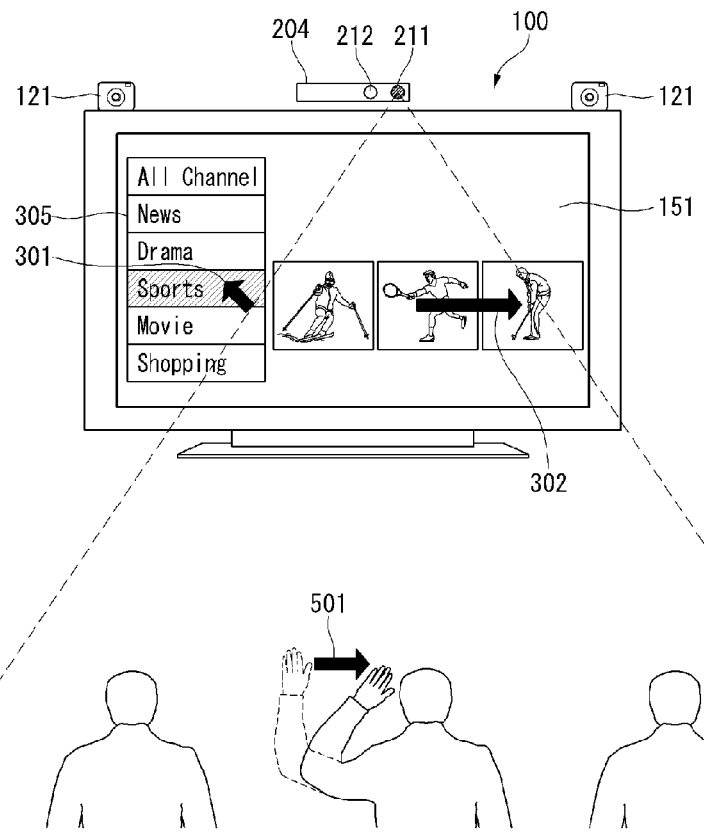
Fig. 14
Volume Control Gesture Reference
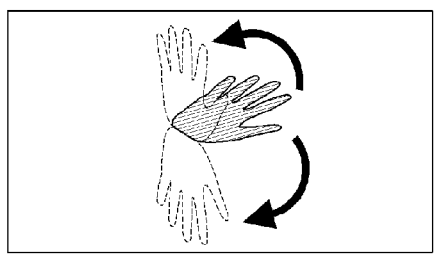
(a) Vertical waving gesture to show the volume control menu
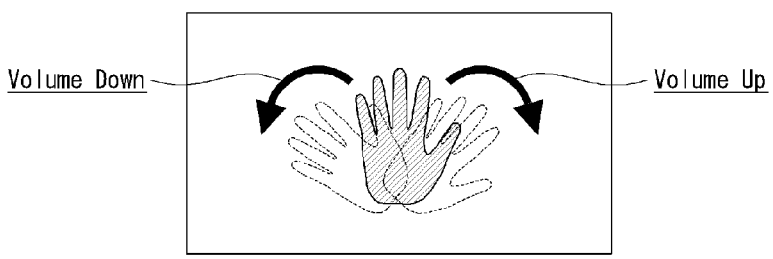
(b) Circling gesture to change the volume Fig. 15
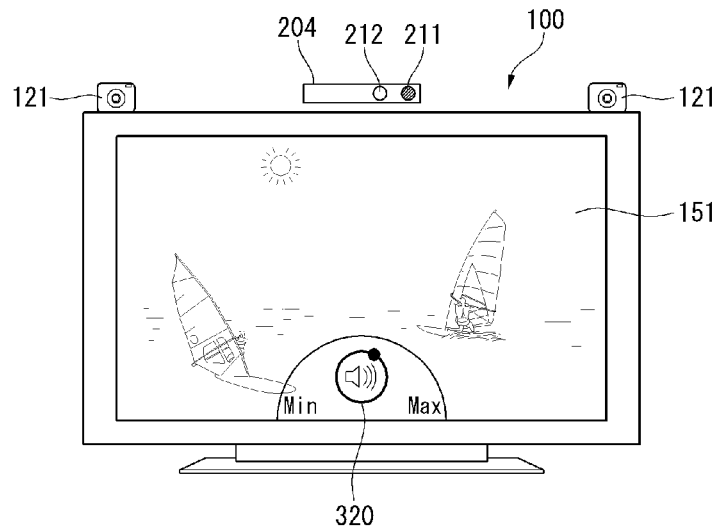
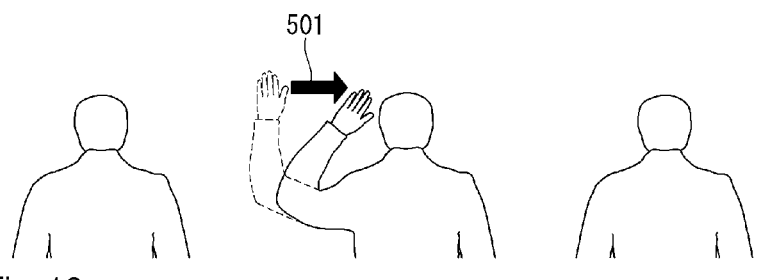
Fig. 16
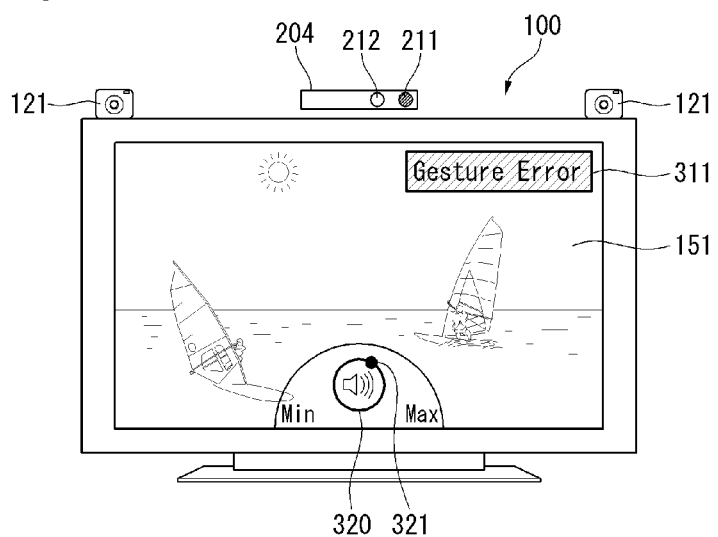

DISPLAY DEVICE AND METHOD OF PROVIDING FEEDBACK FOR GESTURES THEREOF

TECHNICAL FIELD

This document relates to a device and method for providing feedback when a gesture is recognized.

BACKGROUND ART

Nowadays, a television uses user interface (UI) elements that can perform an interaction with a user. Various functions (software) performed through the television can be provided as a program through the user interface element, and in order to improve accessibility, the various UI elements are used.

Accordingly, technologies that can improve usability of a television by efficiently managing various UIs on a television screen are necessary.

DISCLOSURE OF INVENTION

Technical Problem

Exemplary embodiments of the present invention provide a device and a method for providing feedback when a gesture is recognized.

The present invention is not limited to the above embodiments, and further embodiments will be apparent by one of ordinary skill from the following description including the drawings and the claims.

Solution to Problem

An aspect of this document is to provide an image display device and a method of providing feedback for gestures thereof that can efficiently provide feedback for a user's gesture.

Further, according to an implementation of this document, only a control person can hear feedback for a gesture.

Further, according to an implementation of this document, by separating television viewing and the control of the television, the television can be smoothly viewed regardless of a control process of the television.

Advantageous Effects of Invention

An aspect of this document is to provide an image display device and a method of providing feedback for gestures thereof that can efficiently provide feedback for a user's gesture.

Further, according to an implementation of this document, only a control person can hear feedback for a gesture.

Further, according to an implementation of this document, by separating television viewing and the control of the television, the television can be smoothly viewed regardless of a control process of the television.

BRIEF DESCRIPTION OF DRAWINGS

The accompany drawings, which are comprised to provide a further understanding of this document and are incorporated on and constitute a part of this specification illustrate implementations of this document and together with the description serve to explain the principles of this document.

FIG. 1 is a diagram illustrating an image display device according to an implementation of this document;

FIGS. 6 and 7 are diagrams illustrating a change example of a sound output direction of a directional speaker;

FIG. 8 is a diagram illustrating an example in which a gesture input by a user, a gesture command corresponding to the gesture, and feedback sound data corresponding to the gesture command are stored in a memory in a table form;

FIG. 13 is a diagram illustrating an example of outputting feedback sound to a non-directional speaker;

FIG. 14 is a diagram illustrating an example of a reference gesture action for volume adjustment;

FIGS. 15 to 17 are diagrams illustrating a method of providing feedback sound when a gesture recognition error occurs;

BEST MODE FOR CARRYING OUT THE INVENTION

This document will now be described more fully with reference to the accompanying drawings, in which implementations of the invention are shown. The invention may, however, be embodied in many different forms and should not be construed as being limited to the implementations set forth herein; rather, the implementations are provided so that this disclosure will be thorough and complete, and will fully convey the concept of the invention to those skilled in the art.

Hereinafter, a mobile terminal relating to this document will be described below in more detail with reference to the accompanying drawings. In the following description, suffixes "module" and "unit" are given to components of an image display device in consideration of only facilitation of description and do not have meanings or functions discriminated from each other.

The image display device described in the specification can comprise a mobile phone, a smart phone, a laptop computer, a digital broadcasting terminal, personal digital assistants (PDA), a portable multimedia player (PMP), a navigation device and so on.

FIG. 1 is a diagram illustrating an image display device according to an implementation of this document.

Referring to FIG. 1, an image display device 100 is a television having a camera that can photograph a user's gesture and that can recognize the gesture. The television is an illustration, and a method of providing gesture feedback according to this document can be applied to an electronic device comprising a display unit 151, a camera 121, and a speaker. For example, the image display device 100 comprises a mobile phone, a smart phone, a laptop computer, a digital broadcasting terminal, a PDA, a PMP, and a navigation device.

Figure 2:
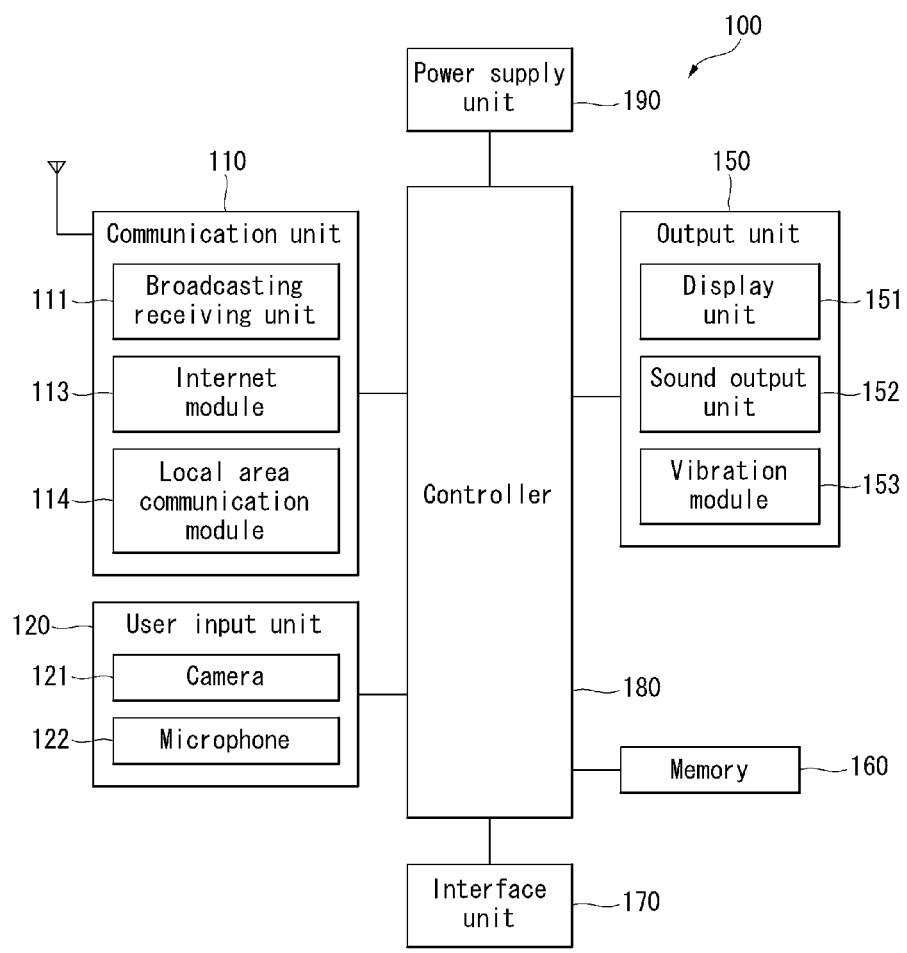
FIG. 2 is a block diagram illustrating a configuration of an image display device according to an implementation of this document.

FIG. 2 is a block diagram illustrating a configuration of the image display device 100 according to an implementation of this document. The image display device 100 comprises a radio communication unit 110, a user input unit 120, an output unit 150, a memory 160, an interface unit 170, a controller 180, and a power supply unit 190. The components shown in FIG. 1 are not essential parts and the number of components comprised in the image display device 100 can be changed.

The components of the image display device 100 will now be described.

The communication unit 110 comprises at least one module that enables radio communication between the image display device 100 and a radio communication system or between the image display device 100 and a network in which the image display device 100 is located. For example, the communication unit 110 may comprise a broadcasting receiving unit 111, a wireless Internet module 113 and a local area communication module 114.

The broadcasting receiving unit 111 receives broadcasting signals and/or broadcasting related information from an external broadcasting management server through a broadcasting channel.

The broadcasting channel comprises a satellite channel and a terrestrial channel. The broadcasting management server can be a server that generates and transmits broadcasting signals and/or broadcasting related information or a server that receives previously generated broadcasting signals and/or broadcasting related information and transmits the broadcasting signals and/or broadcasting related information to a terminal. The broadcasting signals comprise not only television broadcasting signals, radio broadcasting signals, and data broadcasting signals but also signals in a form of a combination of a television broadcasting signal and a radio broadcasting signal.

The broadcasting related information can be information on a broadcasting channel, a broadcasting program, or a broadcasting service provider. The broadcasting related information can be provided even through a mobile communication network. In this case, the broadcasting related information can be received by the mobile communication module.

The broadcasting related information may exist in various forms. For example, the broadcasting related information may exist in a form of an electronic program guide (EPG) of digital multimedia broadcasting (DMB) or in a form of an electronic service guide (ESG) of digital video broadcast-handheld (DVB-H).

The broadcasting receiving unit 111 receives broadcasting signals using various broadcasting systems. Particularly, the broadcasting receiving unit 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving unit 111 can be constructed to be suited to broadcasting systems providing broadcasting signals other than the above-described digital broadcasting systems.

The broadcasting signals and/or broadcasting related information received through the broadcasting receiving unit 111 can be stored in the memory 160.

The wireless Internet module 113 is a module for wireless Internet access and can be comprised in the image display device 100 or externally attached to the image display device 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 is a module for local area communications. Bluetooth, radio frequency identification (RFID), infrared data association (IrDA), ultra wideband (UWB), and ZigBee can be used as a local area communication technique.

Referring to FIG. 1, a user input unit 120 is used to input an audio signal or a video signal and comprises a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the radio communication unit 110. The image display device 100 may comprise at least two cameras according to a constitution of the terminal.

An image frame processed in the camera 121 is stored in the memory 160 or is transmitted to the outside through the communication unit 110. The camera 121 may be formed with at least two according to a configuration of a terminal. Further, the camera 121 can perform two-dimensional or three-dimensional photographing and may be formed as a two-dimensional camera, a three-dimensional camera, or a combination of a two-dimensional camera and a three-dimensional camera.

The microphone 122 receives an external audio signal in a call mode, a recording mode, or a voice recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The output unit 150 comprises a display unit 151, a sound output unit 152, and a vibration module 153.

The display unit 151 displays information processed by the image display device 100. For examples, the display unit 151 displays UI or graphic user interface (GUI) related to a displaying image. The display unit 151 displays a captured or/and received image, UI or GUI when the image display device 100 is in the video mode or the photographing mode.

The display unit 151 comprises at least one of a liquid crystal display, a thin film transistor liquid crystal display, an organic light-emitting diode display, a flexible display, and a three-dimensional display.

The audio output unit 152 can output audio data received from the communication unit 110 or stored in the memory 160 in a audio signal receiving mode and a broadcasting receiving mode. The audio output unit 152 outputs audio signals related to functions performed in the image display device 100. The audio output unit 152 may comprise a receiver, a speaker, a buzzer, etc.

The vibration module 153 outputs a vibration signal for indicating generation of an event of the image display device 100. Examples of events generated in the image display device 100 comprise reception of user's gesture, etc.

The vibration module 153 of the image display device 100 has a specific frequency causing a tactile sense (not shown) by a specific pressure and generates a vibration having a vibration pattern.

The memory 160 can store a program for the operation of the controller 180 and temporarily store input/output data (for example, a broadcasting program, messages, still images, and moving images). The memory 160 can store data about vibrations and sounds in various patterns, which are output when a gesture input is applied to the display unit.

The memory 160 can comprise at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk. The image display device 100 can operate in relation to a web storage performing a storing function of the memory 160 on the Internet.

The interface unit 170 serves as a path for all external devices connected to the image display device 100. The interface unit 170 receives data from the external devices or power and transmits the data or power to the internal components of the image display device 100, or transmits data of the image display device 100 to the external devices. The interface unit 170 may comprise, for example a wired/wireless headset port, an external charger port, a wired/wireless data port, a memory card port, a port for connecting a device having a user identification module, an audio I/O port, a video I/O port, and an earphone port.

The interface unit 170 serves as a path for supplying power from an external cradle to the image display device 100 when the image display device 100 is connected to the external cradle, or a path for supplying various command signals inputted by the user to the image display device 100 through the cradle. The various command signals or power input from the cradle can be used as a signal for determining whether the image display device 100 is accurately set to the cradle.

The controller 180 controls general operations of the image display device 100. For examples, the controller 180 performs control and processing for voice communication, data communication, and video telephony. The controller 180 comprises a gesture recognition unit for analyzing a gesture image input from a user to process the gesture image, and a gesture feedback unit. The gesture recognition unit and the gesture feedback unit will be described in detail in a related part.

The power supply unit 190 receives external power and internal power and provides power required for the operations of the components of the image display device 100 under the control of the controller 180.

Various implementations of this document can be implemented in a computer or similar device readable recording medium using software, hardware, or a combination thereof, for example.

According to a hardware method, the implementations of this document can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the implementations can be implemented by the controller 180.

According to a software method, implementations such as procedures or functions can be implemented with a separate software module executing at least one function or operation. Software codes can be implemented according to a software application written in an appropriate software language. Furthermore, the software codes can be stored in the memory 160 and executed by the controller 180.

Figure 3:
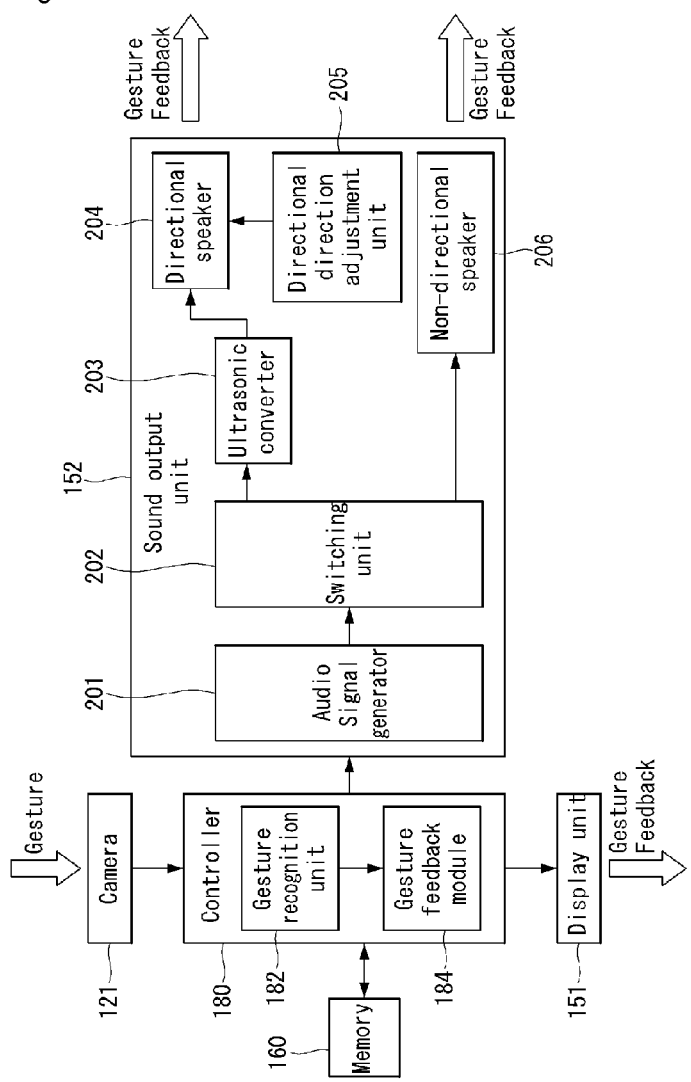
FIG. 3 is a block diagram illustrating an image display device according to an implementation of this document.

FIG. 3 is a block diagram illustrating an image display device according to an implementation of this document.

Referring to FIG. 3, the image display device 100 according to an implementation comprises a camera 121, a controller 180, a display unit 151, and a sound output unit 152, and as describe above, the sound output unit 152 comprises a directional speaker 204 and a non-directional speaker 206 and may further comprise a directional direction adjusting unit 205 for adjusting a sound emission direction of the directional speaker 204.

The camera 121 is integrally formed with the image display device 100 to photograph a user's gesture, or is separately formed from the image display device 100 to transfer the photographed image to the display unit 151 according to a control signal of the controller 180.

Here, the user's gesture photographed by the camera 121 is an intension expression other than a voice of the user of the image display device 100. For example, the user's gesture may comprise various actions of the user, and the user's gesture comprises the user's movement from a first position to a second position, twisting of a body of the user, or a specific shape formed using a specific portion of a body, such as a hand, an arm, and a leg of the user. The gesture is an intension expression other than a voice and thus can be detected by the camera 121.

The camera 121 used for the image display device 100 according to an implementation of this document may be a two-dimensional camera, a three-dimensional camera, or a combination of a two-dimensional camera and a three-dimensional camera. For convenience of description, when describing an implementation of this document, the camera 121 is described as a single, but at least one camera 121 may exist.

When the camera 121 can perform three-dimensional photographing, the camera 121 may be a stereoscopic camera or a time of flight (TOF) camera. The stereo camera can acquire a three-dimensional image using two photographing lenses installed at a predetermined distance. Focuses and exposure of the two lenses are interlocked, and two lenses have a visual point difference, and thus the stereo camera can three-dimensionally see a subject. The TOF camera acquires a three-dimensional image by measuring a returning time of light radiated to a subject.

In general, an angle of view of the camera 121 is limited to a predetermined range (e.g., 15° to 60°). When a gesture action exists at a position of deviating a range of an angle of view of the camera 121, the user's gesture cannot be photographed. Therefore, in this document, it is necessary to change a sound emission direction of gesture feedback according to the user's moving direction and thus the camera 121 may have a rotation means for enabling a rotation thereof in a vertical direction and a lateral direction according to a moving direction of the user.

The controller 180 comprises a gesture recognition unit 182 for determining a gesture command of a gesture image acquired through the camera 121. The gesture recognition unit 182 determines a gesture command corresponding to a gesture input by the user through a predetermined image processing process.

The gesture recognition unit 182 processes an image with various methods, and the method comprises, for example a method of detecting the user's skin tone. A skin color of a face and hands of a human being is generally exposed as it is. Further, a face has a lateral symmetrical shape, and eyes generally have a relatively dark color. The user's face can be detected through such a characteristic color pattern. Further, a skin color subject that relatively freely moves within a predetermined radius from a face and that has a size smaller than that of a face is recognized as a hand of a body portion. In a hand, when closing a fist can be displayed with a skin color smaller than when opening a fist, and in a portion recognized as a hand, when a portion having a skin color and a portion having no skin color alternatively exist, it can be recognized that a fist is opened. The gesture recognition unit 182 processes an image with a method of extracting several specific characteristics, as describe above.

The controller 180 further comprises a gesture feedback module 184. The gesture feedback unit 184 determines a gesture feedback type notifying the user whether a specific gesture was recognized or was not recognized. The gesture feedback type may comprise, for example, at least one of a visual type, an auditory type, and a tactile type.

The gesture feedback unit 184 visually provides through the display unit 151 that a gesture was recognized. For example, in order to determine that a gesture was recognized, an icon that can be recognized by the user may be displayed. Alternatively, a predetermined text message describing that the gesture was recognized may be displayed. Alternatively, another image to be related to the gesture may be displayed to the user. Therefore, when the gesture recognition unit 182 recognizes the user's gesture as a gesture command for storing a specific file, the gesture feedback unit 184 displays an icon notifying the user that the specific file was stored. Further, a text message of "file storage" can be displayed.

When the gesture recognition unit 182 recognizes the user's gesture as a gesture command that instructs to provide at least one text character, the gesture feedback unit 184 displays the at least one text character. For example, when a gesture is recognized as a command that instructs to generate a character "A", in order to notify the user that the gesture was recognized, the gesture feedback unit 184 displays a character "A".

According to an implementation, the gesture feedback sound can be heard to only a person who acquires a gesture control right of the image display device 100 through the directional speaker 204. Hereinafter, a block configuration of the sound output unit 152 for providing gesture feedback sound according to an implementation to a user who acquires a control right through the directional speaker 204 will be described in detail.

The sound output unit 152 comprises an audio signal generator 201, a switching unit 202, an ultrasonic converter 203, a directional speaker 204, a directional direction adjustment unit 205, and a non-directional speaker 206.

The audio signal generator 201 receives feedback sound data from the gesture feedback unit 184 to generate a feedback sound signal. When the gesture feedback unit 184 determines that feedback is auditorily provided, the audio signal generator 201 receives sound data for generating a sound signal from the gesture feedback unit 184.

Sound data receiving from the gesture feedback unit 184 are various according to a kind of a gesture command corresponding to a recognized gesture. For example, feedback sound data corresponding to a gesture command for selecting a specific item displayed in the display unit 151 and feedback sound data corresponding to a gesture command for moving an item page in order to select the specific item are differently set and provided.

The switching unit 202 comprises a first switching unit (not shown) for switching a feedback sound signal generated in the audio signal generator 201 to the directional speaker 204 through the ultrasonic converter 203 and a second switching unit (not shown) for switching the feedback sound signal to the non-directional speaker 206. Further, the feedback sound signal may be simultaneously emitted through the directional speaker 204 and the non-directional speaker 206. That is, the switching unit 202 switches a predetermined feedback sound signal to the directional speaker 204 or the non-directional speaker 206 by the control of the controller 180.

The ultrasonic converter 203 converts a gesture feedback sound signal generated in the audio signal generator 201 to an ultrasonic signal and transfers the ultrasonic signal to the directional speaker 204. The ultrasonic signal converted through the ultrasonic converter 203 is a signal that has a strong straight propagation property like light and that can be emitted in a beam form. When two ultrasonic waves having different frequencies are emitted to the air, the two ultrasonic waves interfere and thus a sound signal corresponding to the sum and the difference of two sound waves occurs.

Therefore, when ultrasonic waves are selected so that sound corresponding to a difference between the two ultrasonic waves has a frequency to be heard by the user's ear, sound becomes heard only at a place in which the interference occurs. That is, because the ultrasonic waves (frequency of 20 kHz or more) comprise a frequency far exceeding an audible range (20 to 20,000 Hz) of a person, the ultrasonic waves cannot be generally heard by a person's ear.

However, when ultrasonic beam passes through space, the ultrasonic waves have a distorting property in a predictable direction by an intrinsic attribute of space. Such distortion can be converted to a frequency component of an audible band, and the ultrasonic converter 203 can accurately predict and minutely adjust distortion.

The directional speaker 204 is a speaker in which only persons existing in a sound output direction of the directional speaker 204 can hear sound and in which persons existing at a periphery of a sound output direction cannot hear sound, as intensity of an emitted sound pressure changes according to an angle deviating from a front axis of the directional speaker 204.

Feedback sound emitted through the directional speaker 204 has predetermined sound zones W1, W2, and W3 and a directional direction. That is, the sound zones W1, W2, and W3 may be an area existing within a position separated by a predetermined range from a front axis of the speaker. The sound zones W1, W2, and W3 can be preset by the user, and the controller 180 adjusts a directional range according to a preset value.

Figure 4:
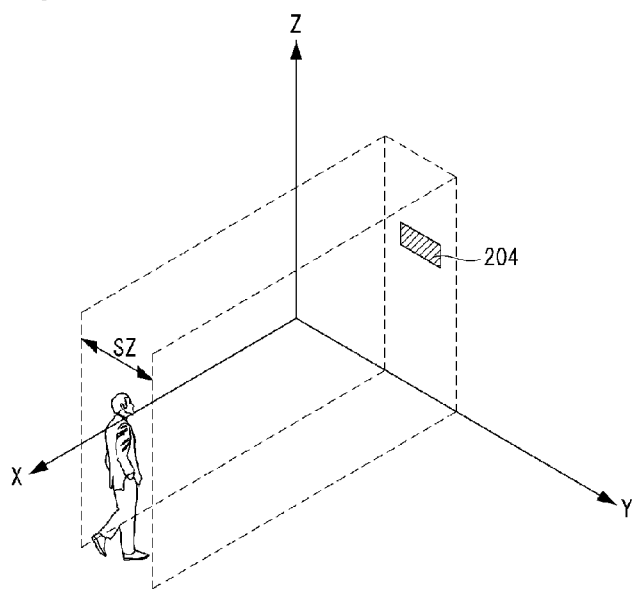
FIG. 4 is a diagram illustrating an example of a sound zone of a directional speaker shown in FIG. 3.
Figure 5:
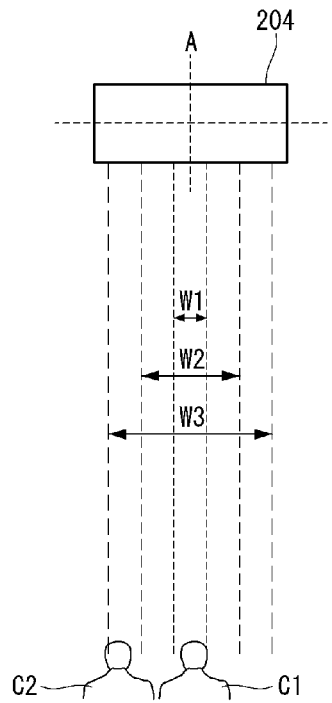
FIG. 5 is a diagram illustrating an example of a changing sound zone according to setting of the sound zone of FIG. 4.

FIG. 4 is a diagram illustrating an example of a sound zone of a directional speaker shown in FIG. 3, and FIG. 5 is a diagram illustrating an example of a changing sound zone according to setting of the sound zone of FIG. 4.

Referring to FIG. 4, because sound that is output from the directional speaker 204 has a strong straight propagation property, the output sound can be heard within a sound zone SZ, but the output sound cannot be heard at the outside of the sound zone. Therefore, when a control person takes a gesture within the sound zone, only the control person can hear feedback sound for the gesture.

Referring to FIG. 5, a sound zone that can hear the output of the directional speaker 204 can be changed according to the user's setting. Therefore, when a sound zone is set as a first sound zone W1, a second control person C2 cannot hear sound that is output through the first sound zone W1. The second control person C2 can hear only sound that is output through a third sound zone W3.

Therefore, feedback sound emitted through the directional speaker 204 has a predetermined directional direction. In a general non-directional speaker, emitted sound has a property of diffusing in all directions, but because sound emitted through the directional speaker 204 has a strong straight propagation property, the feedback sound can have directivity. Here, strong directivity indicates that sound is focused and output in one direction. For example, when using the directional speaker 204, only persons around a corresponding exhibit in a museum, etc., can hear an explanation for the exhibit.

Referring again to FIG. 3, the directional direction adjustment unit 205 adjusts an output direction of a sound signal so that the directional speaker 204 outputs a sound signal in a specific direction according to a control signal of the controller 180.

According to an implementation, the directional direction adjustment unit 205 can adjust only a sound output direction of the directional speaker 204 in a lateral direction (or a vertical direction) according to a control signal of the controller 180. In this case, the directional speaker 204 does not rotate or move to correspond to the user's moving direction.

Figure 6:
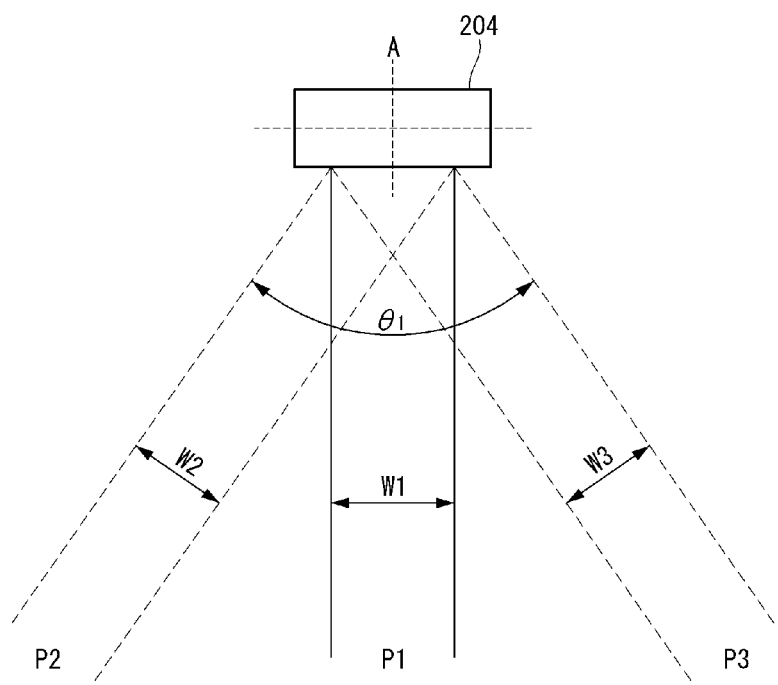

FIGS. 6 and 7 are diagrams illustrating a change example of a sound output direction of a directional speaker.

Referring to FIG. 6, while the user takes a gesture at a first position P1 in a front axial direction of the directional speaker 204, it is assumed that the user moves to a second position P2 and takes a gesture. In this case, the directional speaker 204 can output feedback sound to the second position P2 by the control of the directional direction adjustment unit 205. Similarly, when the user moves to a third position P3 and takes a gesture, the directional speaker 204 can output the feedback sound to the third position P3. Therefore, when the user who acquires a control right takes a gesture at the second position P2, only the control person within a directional area W2 of the second position P2 can hear the feedback sound. However, when other persons other than the control person exist within the directional area W2, the other persons together with the control person can hear the feedback sound. A directional angle θ1 related to a directional direction of the directional speaker 204 shown in FIG. 6 can be predefined by the user, and a range of the directional angle θ1 can be adjusted according to a hardware performance.

According to an implementation, the directional direction adjustment unit 205 may be a motor.

Referring to FIG. 7, when the user's moving direction is taken through the camera 121, by driving a motor (not shown) by the control of the controller 180, a front axis of the directional speaker 204 is rotated to face toward the control person using the rotary power of the motor. In this case, the controller 180 can rotate the directional speaker 204 by directly applying the rotary power of the motor to the directional speaker 204. A directional angle θ2 related to a directional direction of the directional speaker 204 shown in FIG. 7 can be predefined by the user, a range of the directional angle θ2 can be adjusted according to a hardware performance.

Referring again to FIG. 3, the sound output unit 152 comprises a non-directional speaker 206. Gesture feedback sound data that are input from the controller 180 are converted to sound through the audio signal generator 201, and gesture feedback sound converted to the sound is output to the front. The gesture feedback sound that is output from the non-directional speaker 206 has characteristics of dispersing in a horizontal direction and/or a vertical direction.

According to an implementation, the controller 180 can provide gesture feedback sound to the user using one of the directional speaker 204 and the non-directional speaker 206.

When it is determined that feedback sound should be transmitted to only the control person, the controller 180 switches a feedback sound signal generated through the audio signal generator 201 with the ultrasonic converter 203 and outputs the feedback sound signal to the control person side through the directional speaker 204.

When feedback sound is allowed to transmit to everybody viewing a television and the control person, the controller 180 switches a feedback sound signal generated through the audio signal generator 201 with the non-directional speaker 206 and outputs feedback sound to everybody viewing a television and the control person through the non-directional speaker 206.

That is, when a gesture command corresponding to the user's gesture exists, the controller 180 outputs the gesture feedback sound through the non-directional speaker 206, and when a corresponding gesture command does not exist, the controller 180 outputs the gesture feedback sound through the directional speaker 204.

The memory 160 stores a gesture command corresponding to a gesture input by the control person. Here, the gesture command corresponds to a specific gesture image acquired through the camera 121 and may be a combination of commands that can execute a specific program. When a predetermined gesture is input through the camera 121, the controller 180 analyzes an image of the acquired gesture and reads the gesture command corresponding to the gesture image from the memory 160.

In order to notify with predetermined sound that the gesture was recognized, the memory 160 matches feedback sound data and a gesture image to each gesture command and stores the feedback sound data, and the gesture image, and the each gesture command.

FIG. 8 is a diagram illustrating an example in which a gesture input by a user, a gesture command corresponding to the gesture, and feedback sound data corresponding to the gesture command are stored in a memory in a table form.

Referring to FIG. 8, in order to turn on a television, a "waving gesture" is necessary, and when the "waving gesture" is recognized, "first audio" is output to the control person through the directional speaker.

A "horizontal waving gesture" corresponds to a gesture command that provides a menu for a channel change to the display unit 151, and feedback sound corresponding to a gesture command of providing the channel change menu may be second audio. In a state where a menu for a channel change is provided, a "circling gesture of rotating a hand counterclockwise or clockwise" corresponds to a gesture command of directly changing the channel, and feedback sound corresponding to a gesture command for a channel change may be third audio.

A "vertical waving gesture" corresponds to a gesture command that provides a menu for adjusting a volume to the display unit 151, and feedback sound corresponding to a gesture command that provides the volume adjustment menu may be second audio. In a state where the volume adjustment menu is provided, the circling gesture corresponds to a gesture command that increases or decreases the volume, and feedback sound corresponding to a gesture command for the volume adjustment may be third audio.

Further, a "pushing gesture" to the front toward a television corresponds to a gesture command of selecting a predetermined channel or executing a specific program, and feedback sound corresponding to the selection gesture command may be fourth audio.

In a table shown in FIG. 8, feedback sound corresponding to a specific gesture may be overlapped. That is, even if gesture actions are different, feedback sound may be equal. For example, referring to FIG. 8, a gesture for displaying a channel change menu and a gesture for displaying a volume adjustment menu are different, but feedback sound corresponding to each gesture may be second audio.

That is, kinds of the two different gestures are different (channel and volume), but a gesture command corresponding to the each gesture performs an action that changes a specific parameter and thus they are similar. Therefore, the similar feedback sound can give a learning effect to the control person.

In the foregoing description, a detailed block configuration and a function of each block configuration of an image display device according to an implementation have been described with reference to FIGS. 3 to 8. Hereinafter, a method of providing gesture feedback of an image display device according to an implementation of this document will be described with reference to the drawings.

Figure 9:
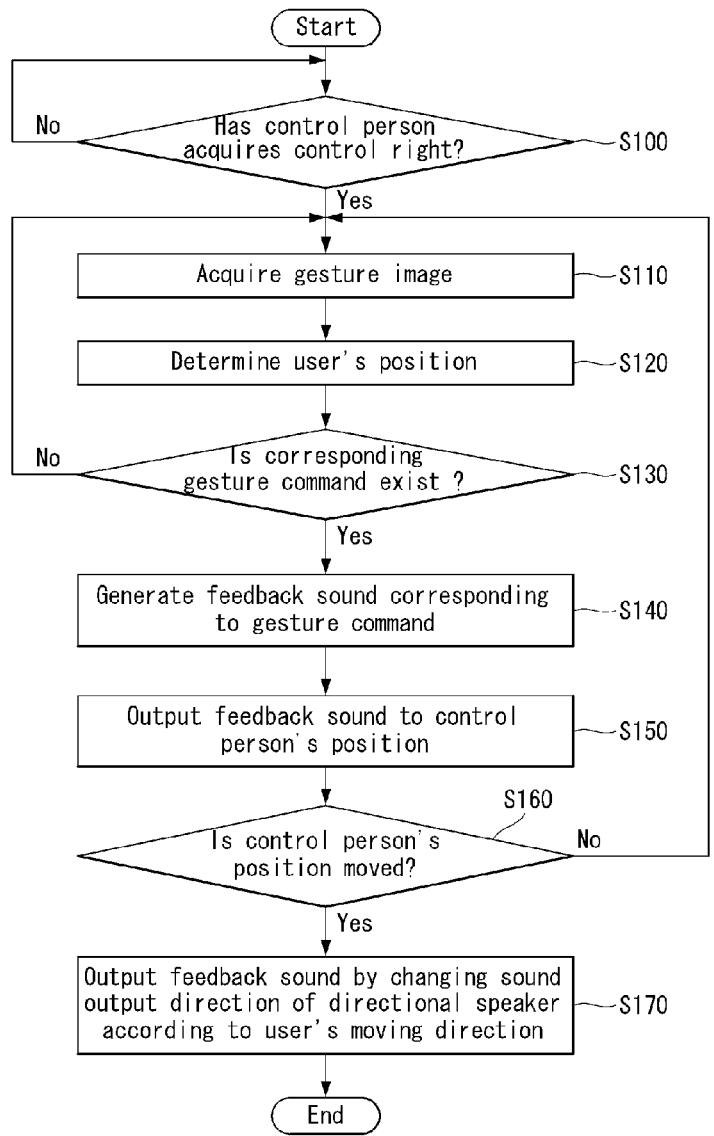
FIG. 9 is a flowchart illustrating a method of providing gesture feedback of an image display device according to an implementation of this document.

FIG. 9 is a flowchart illustrating a method of providing gesture feedback of an image display device according to an implementation of this document.

In order for a control person to control the image display device 100, the controller 180 determines whether the control person acquires a control right (S100). Here, the control right is acquired through a predefined predetermined gesture action. For example, in a state where the television is turned off, the control person can turn on the television through a predetermined gesture (e.g., a gesture of pushing two hands toward a television screen of the front). In a state where a television is turned off, it is meaningless to classify into a person who acquires a control right and a person who does not acquire a control right. Further, in a state where a television is turned on, in a control right acquisition mode in which a predetermined menu for acquiring a control right is provided, the control person can acquire the control right. The control right can be acquired with various known methods.

After a control right is acquired, when the control person takes a specific gesture, the camera 121 acquires a gesture image by photographing the gesture (S110). The controller 180 determines the user's position based on the acquired gesture image (S120).

The controller 180 determines whether a gesture command corresponding to the user's gesture acquired through the gesture recognition unit 182 exists (S130). The controller 180 determines whether a gesture command corresponding to the control person's gesture exists with reference to stored matching data through a table shown in FIG. 8 of the memory 160. If a gesture command corresponding to the user's gesture acquired through the gesture recognition unit 182 does not exist, the process returns to step S110.

If a gesture command corresponding to the control person's gesture exists, the controller 180 generates feedback sound corresponding to the gesture command (S140). The controller 180 determines feedback sound data corresponding to the gesture command in the memory 160, and outputs the feedback sound to the control person's position through the directional speaker 204 by inputting the feedback sound data to the sound output unit 152 (S150).

The control person can move a position while viewing the television. The controller 180 determines whether the control person's position is moved (S160). If the control person's position is moved, the controller 180 controls to emit feedback sound by changing a sound output direction of the directional speaker 204 according to the user's moving direction (S170). If the control person's position is not moved, the process returns to step S110.

Figure 10:
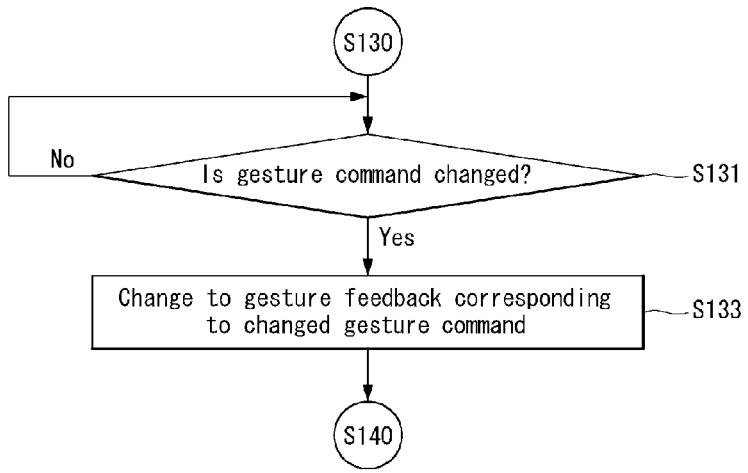
FIG. 10 is a flowchart explaining a process of providing feedback sound in the method of providing gesture feedback of FIG. 9.

FIG. 10 is a flowchart of explaining a process of providing feedback sound in the method of providing gesture feedback of FIG. 9.

Referring to FIG. 10, the controller 180 determines whether a gesture command is changed (S131). If a gesture command is changed, the controller 180 changes feedback sound and provides the changed feedback sound (S133). When the input gesture is changed, the controller 180 determines a gesture command corresponding to the changed gesture, generates feedback sound corresponding to the gesture command, and outputs the feedback sound to a position of a control right through the directional speaker 204. An example of a gesture change and a change example of a gesture command corresponding thereto are described with reference to FIG. 8.

Figure 11:
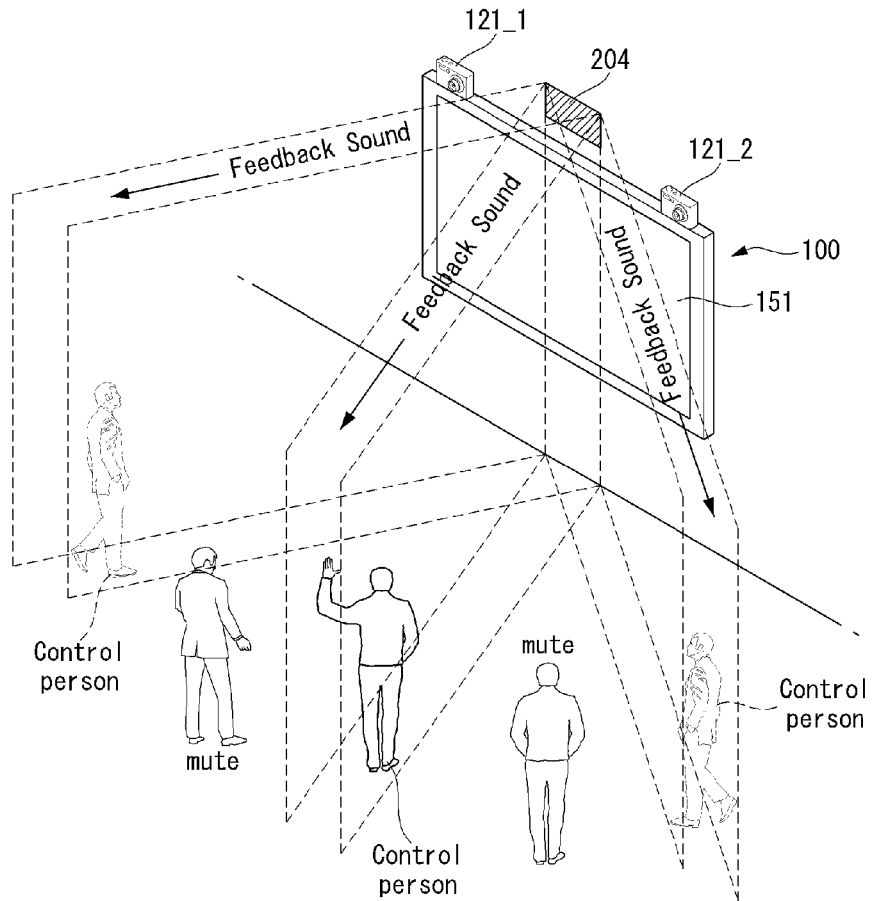
FIG. 11 is a diagram explaining the method of providing gesture feedback of FIG. 9.

FIG. 11 is a diagram explaining the method of providing gesture feedback of FIG. 9.

The image display device 100 acquires the control person's gesture image through cameras 121_1 and 121_2, analyzes the acquired gesture image, and outputs feedback sound corresponding to the gesture to the control person's position through the directional speaker 204.

Here, because feedback sound is output through the directional speaker 204, only the control person positioned within a sound zone and a directional direction of the directional speaker 204 can hear the feedback sound, and a person positioning at a point deviating the sound zone cannot hear the feedback sound.

Further, when the control person's position is moved, the controller 180 of the image display device 100 determines position movement of the control person through the cameras 121_1 and 121_2. Further, when the moved position of the control person is recognized through the camera, the controller 180 transmits feedback for the control person's gesture at the moved position to the moved position. In this case, as describe above, the controller 180 changes a sound output direction of the directional speaker 204 according to the user's moving direction, or controls a sound emission direction of the directional speaker 204 using the rotary power of a predetermined motor (not shown).

The foregoing description has been described with reference to FIGS. 9 to 11 that feedback sound corresponding to the control person's specific gesture is output in a direction of the control person through a directional speaker, and when the control person's position is moved, a sound output direction of the directional speaker can be also changed to correspond to the moved position of the control person.

In the foregoing implementation, the sound output unit 152 of the image display device 100 comprises a non-directional speaker 206 and a directional speaker 204, and hereinafter, a method of providing gesture feedback that can efficiently provide gesture feedback by appropriately using the directional speaker 204 or the non-directional speaker 206 will be described.

Figure 12:
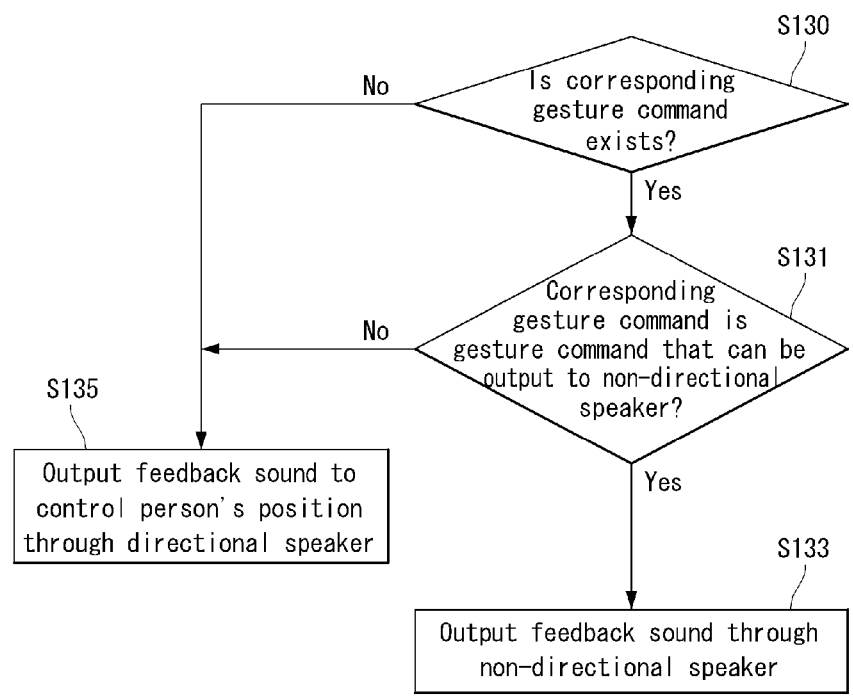
FIG. 12 is a flowchart illustrating a method of providing gesture feedback of an image display device according to an implementation of this document.

FIG. 12 is a flowchart illustrating a method of providing gesture feedback of an image display device according to an implementation of this document.

Referring to FIG. 12, a process before step S130 has been described with respect to FIG. 9 and therefore a description thereof will be omitted.

The controller 180 determines whether a gesture command corresponding to the control person's gesture exists (S130). If a gesture command corresponding to the control person's gesture exists, the controller 180 determines whether the corresponding gesture command is a gesture command that can be output to a non-directional speaker (S131), and if the corresponding gesture command is a gesture command that can be output to a non-directional speaker, the controller 180 outputs feedback sound through the non-directional speaker (S133).

If a gesture command corresponding to the control person's gesture does not exist at step 130, or if the corresponding gesture command is not a gesture command that can be output through a non-directional speaker at step 131(for example, when it is necessary to provide gesture feedback sound for the control person's gesture to only the control person), the controller 180 outputs the feedback sound to the control person's position through the directional speaker (S135).

FIG. 13 is a diagram illustrating an example of outputting feedback sound to a non-directional speaker.

For example, when it is necessary to provide gesture feedback sound for the control person's gesture to everybody viewing a television, or when the gesture feedback sound does not disturb the television viewing (e.g., a gesture for selecting a channel), gesture feedback sound can be transmitted to everybody viewing the television through the non-directional speaker 206.

That is, it can be predefined by the user whether to transmit feedback sound for a specific gesture to only the control person through a directional speaker, or whether to share feedback sound to everybody through a non-directional speaker. For example, even if other persons hear feedback sound for various gestures in which a user selects a predetermined program, the feedback sound does not disturb television viewing of the other persons.

Referring to FIG. 13, the controller 180 may visually provide feedback corresponding to the control person's gesture through the display unit 151. For example, when the control person takes a gesture 301 of selecting an item "sports & entertainment" of a menu 305 for selecting a program to view, the controller 180 visually differently provides an item "sports & entertainment" of the menu 305 through the display unit 151. Further, the controller 180 can visually provide that program indicators are moved to correspond to a gesture 302 for selecting a specific program.

Here, the sound output unit 152 (speaker) comprises both the directional speaker 204 and the non-directional speaker 206, and in FIG. 13, the user can see through an indicator 211 that feedback sound is provided through the non-directional speaker 206. In FIG. 13, reference numeral 211 is an indicator representing that a non-directional speaker is a turn-on state, and reference numeral 212 is an indicator representing that a directional speaker is a turn-on state.

However, when adjusting a volume while viewing a specific program, or due to an error of gesture recognition while adjusting the volume, if feedback sound of a specific tone occurs, this may disturb other persons viewing the television. Hereinafter, an example of providing feedback sound for the control person's gesture through the directional speaker 204 will be described.

FIG. 14 is a diagram illustrating an example of a reference gesture action for volume adjustment.

Referring to FIG. 14, the control person can adjust a volume through a gesture while viewing a television program. In order to adjust the volume through a predetermined gesture, the image display device 100 should be in a volume adjustment mode state through the gesture. As shown in FIG. 14(a), in order to display a volume adjustment menu in the display unit 151, the control person can take a vertical waving gesture using a palm based on a wrist. When a gesture shown in FIG. 14(a) is input, the controller 180 provides a volume adjustment menu to the display unit 151 in order to adjust a volume through the gesture.

When the volume adjustment menu is provided, as shown in FIG. 14(b), a gesture of rotating counterclockwise corresponds to a "volume up gesture command", and a gesture of rotating clockwise corresponds to a "volume down gesture command". In the volume adjustment mode, a circling gesture to right using the entire palm based on a wrist portion corresponds to a gesture command for increasing a volume, and a "circling gesture to left" corresponds to a gesture command for decreasing a volume.

Figure 17:
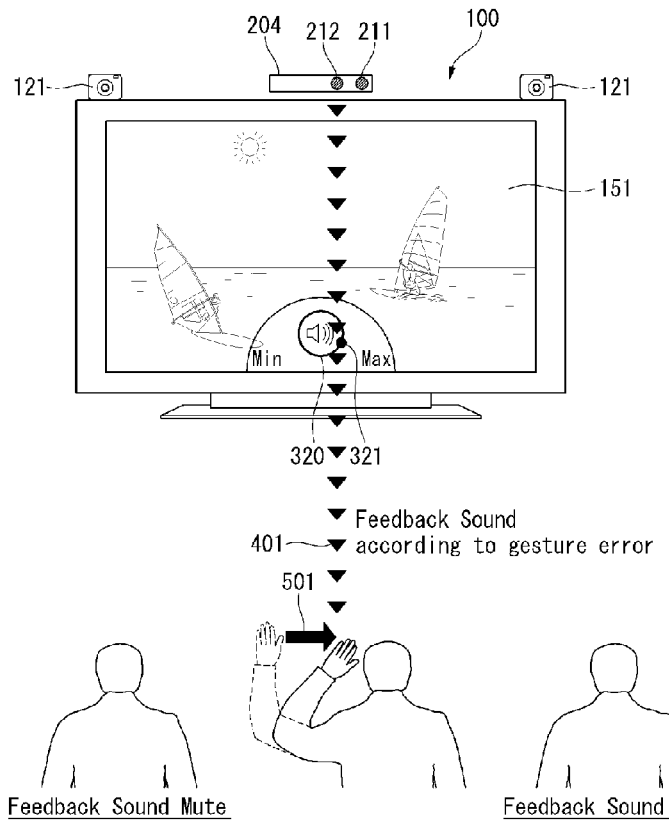

FIGS. 15 to 17 are diagrams illustrating a method of providing feedback sound when a gesture recognition error occurs.

While viewing a predetermined television program, it is assumed that the control person's gesture causes a recognition error. For example, when a coinciding gesture action does not exist between a gesture image acquired through a camera and at least one predefined gesture action stored in the memory 160, the controller 180 can output a predetermined "sound message" or "sound tone" through the sound output unit 152 in order to induce a right gesture to the control person.

Referring to FIG. 15, while viewing a specific program through a television, when the control person adjusts a volume through a gesture, the television is first advanced to a volume adjustment mode. Here, by taking a predetermined gesture action, for example, a vertical waving gesture, the television is advanced to a volume adjustment mode.

As shown in FIG. 14, in the volume adjustment mode, a "circling gesture to right" using the entire palm of the hand based on a wrist portion corresponds to a gesture command of increasing a volume, and a "circling gesture to left" corresponds to a gesture command of decreasing a volume.

However, when the user takes a gesture moving in a left horizontal direction instead of a rotation gesture, the gesture recognition unit 182 of the controller 180 can recognize that a gesture command corresponding to a gesture of moving in a horizontal direction does not exist, in the volume adjustment mode. When such a gesture recognition error exists, the controller 180 can visually or auditorily provide feedback for the gesture in order to induce a right gesture to the control person.

FIG. 16 is a diagram illustrating an example of visually providing an error message when a gesture recognition error exists.

Feedback related to such a gesture recognition error is necessary for the control person, but may be unnecessary sound to other viewers. That is, it is preferable to transmit feedback sound for a gesture error to only the control person through the directional speaker 204.

FIG. 17 is a diagram illustrating an example of outputting feedback sound in a direction of the control person through a directional speaker when a gesture recognition error exists.

As describe above, when a volume adjustment menu 320 is provided, in order to adjust a volume, a gesture of rotating a hand clockwise or counterclockwise is necessary. However, as shown in FIG. 15, in a gesture of moving a hand from the left to the right, because a gesture command corresponding thereto does not exist, the controller 180 can process as a gesture is not recognized. Accordingly, feedback sound for a gesture recognition error can be transmitted to the control person through the directional speaker 204. Persons viewing a television at a periphery of the control person cannot hear the feedback sound.

Figure 18:
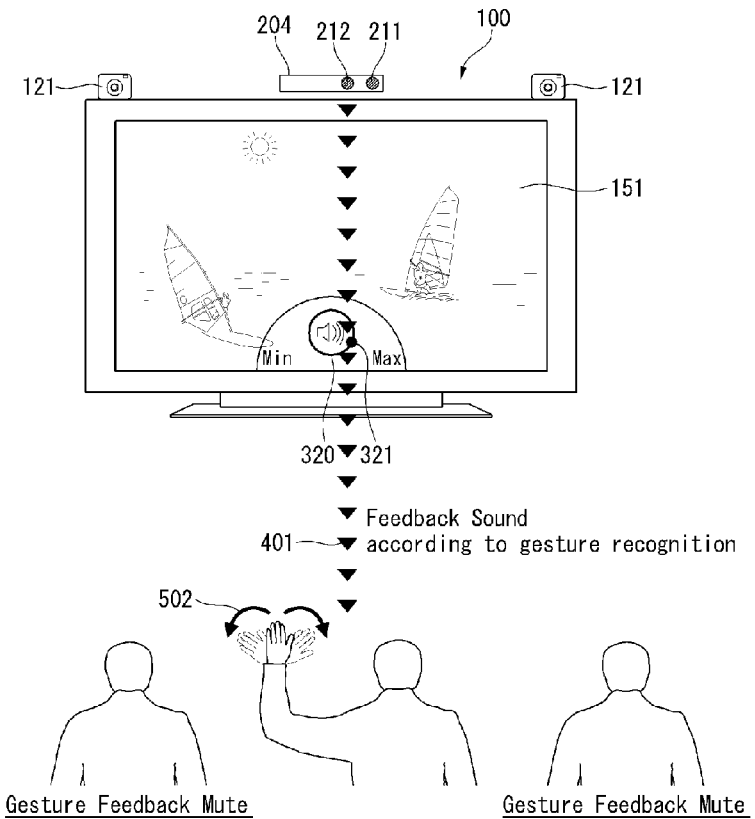
FIGS. 18 and 19 are diagrams illustrating an example of providing gesture feedback through a directional speaker.
Figure 19:
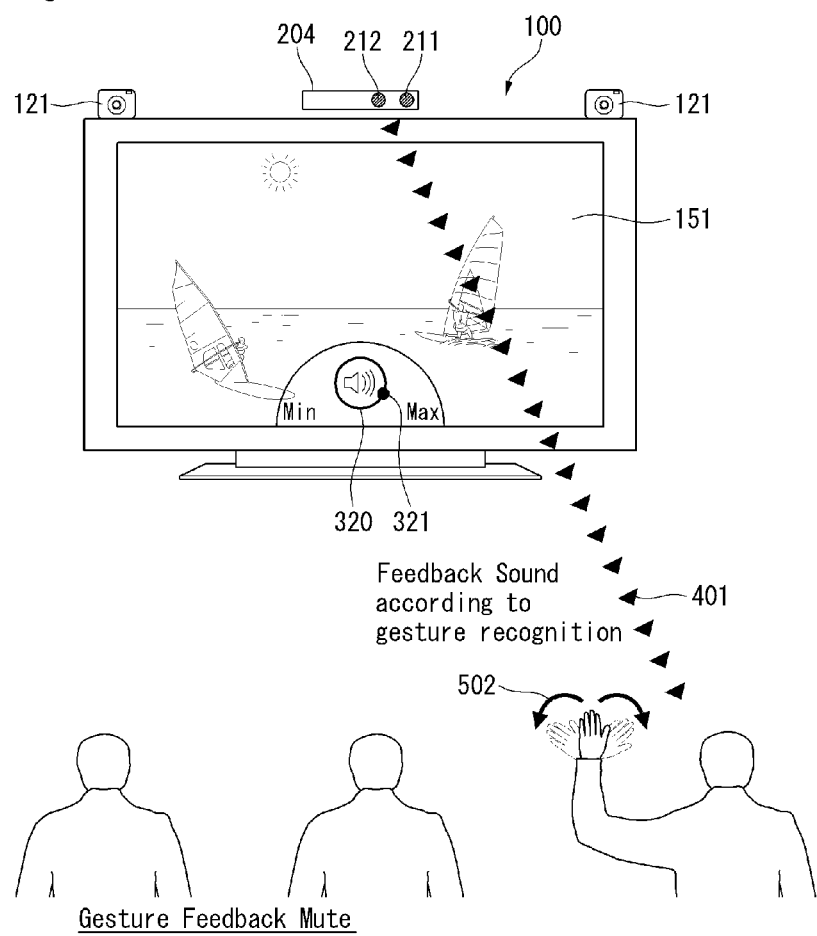

FIGS. 18 and 19 are diagrams illustrating an example of providing gesture feedback through a directional speaker.

Referring to FIGS. 18 and 19, even if an error does not occur in gesture recognition, it is necessary to transmit feedback sound to only the control person through a directional speaker. That is, even when the controller 180 appropriately recognizes a gesture, it is necessary to provide feedback to only the control person. For example, while viewing a television, when the control person takes a gesture of adjusting a volume, a counterclockwise gesture of one time can raise a volume by one level, and whenever the gesture is taken one by one, when feedback sound corresponding thereto is provided through a non-directional speaker, the feedback sound may be heard as noise to other television viewers. Therefore, feedback sound can be output to only the control person through a directional speaker so that the feedback sound can be heard to only the control person.

Figure 20:
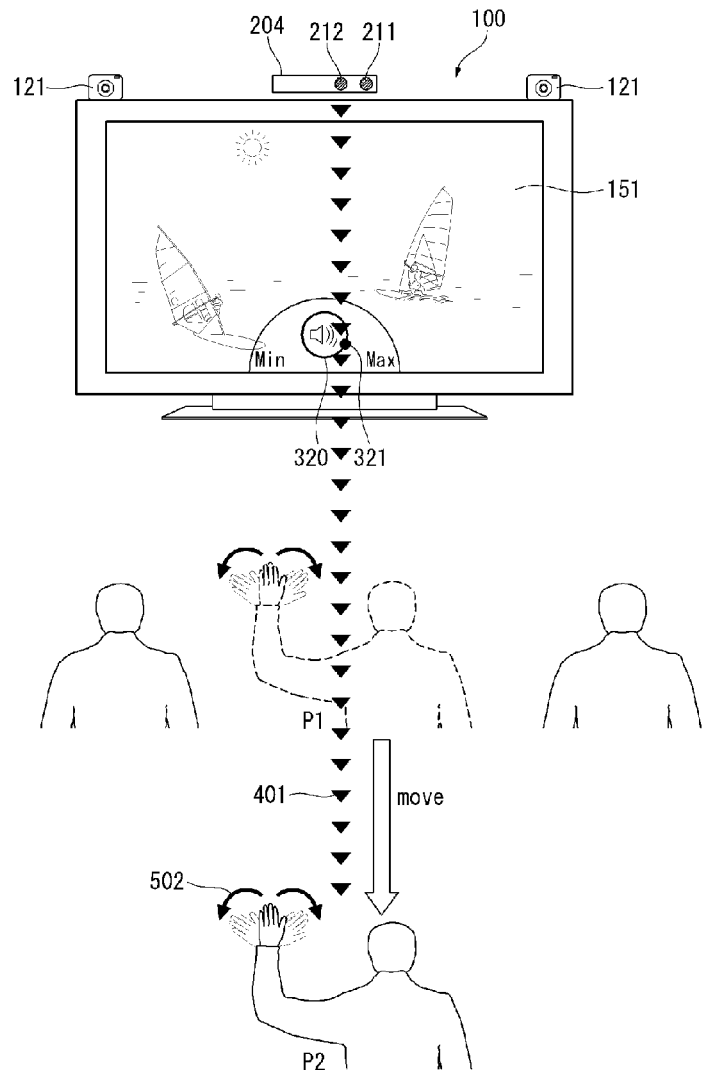
FIG. 20 is a diagram illustrating another example of providing gesture feedback through a directional speaker.

FIG. 20 is a diagram illustrating another example of providing gesture feedback through a directional speaker.

Feedback media can be differently provided according to a distance between a control person and a television. Here, the feedback can be visually or auditorily provided through feedback media.

Referring to FIG. 20, while visual feedback 321 is provided through the display unit 151, when the control person recedes from the television, the control person may not clearly recognize the visually provided feedback. When the control person moves from a first position P1 to a second position P2, the feedback sound can be output to the second position using the directional speaker 204 together with the visual feedback 321.

Therefore, the controller 180 can visually display feedback corresponding to a gesture according to a distance between the control person and the television through the display unit 151, or auditorily provide through a directional speaker together with a visual expression.

Figure 21:
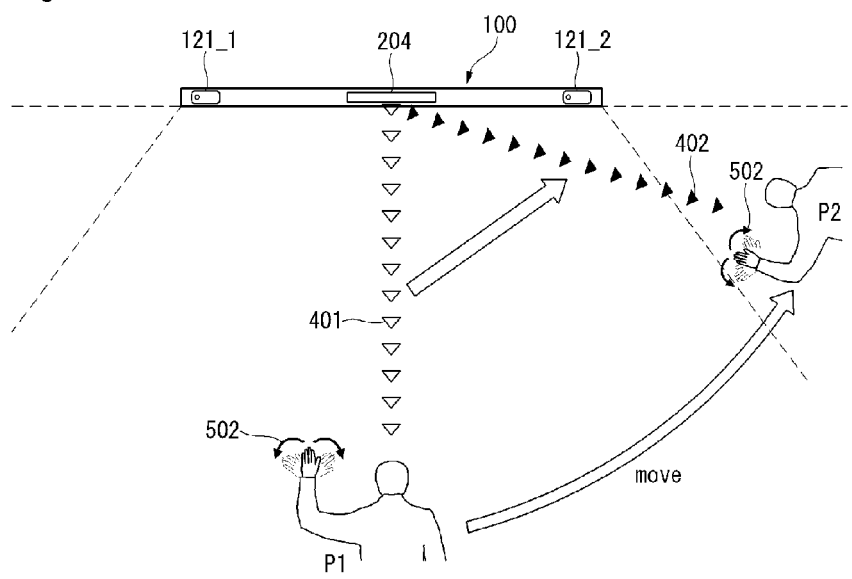
FIG. 21 is a diagram illustrating another example of providing gesture feedback through a directional speaker.

FIG. 21 is a diagram illustrating another example of providing gesture feedback through a directional speaker.

The feedback media can be differently provided according to an angle between the control person and the television.

Referring to FIG. 21, while visual feedback is provided through the display unit 151, when the control person deviates from a viewing area for viewing the television at a present position P1 and moves to a position P2, the control person may not clearly recognize visually provided feedback.

While detecting the control person's motion through the camera 121, when the control person's position deviates a specific area, or when the control person cannot clearly recognize feedback displayed at a present position of the control person other than a blind spot area, auditory feedback can be provided through a directional speaker.

Figure 22:
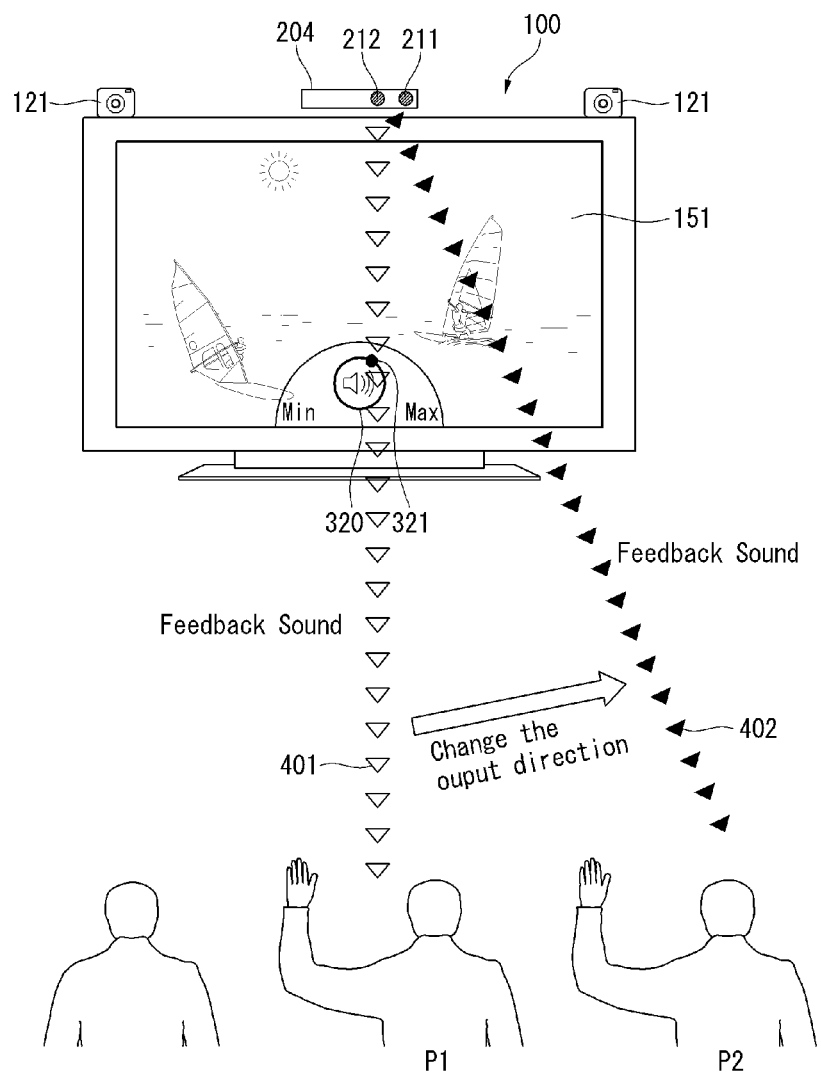
FIG. 22 is a diagram illustrating another example of providing gesture feedback through a directional speaker.

FIG. 22 is a diagram illustrating another example of providing gesture feedback through a directional speaker.

When the control person is changed, the controller 180 outputs feedback sound by adjusting a sound output direction of a directional speaker in a direction of a person who newly acquires a control right.

Referring to FIG. 22, while providing feedback sound to a first position P1 for the control person existing at the first position P1, when a person existing at a second position P2 newly acquires a control right of the image display device 100, the directional speaker 204 can output feedback sound for a gesture of the control person of the second position P2 to the second position P2.

A control right that can control the image display device 100 by a gesture can be acquired by a predefined gesture of the user.

Figure 23:
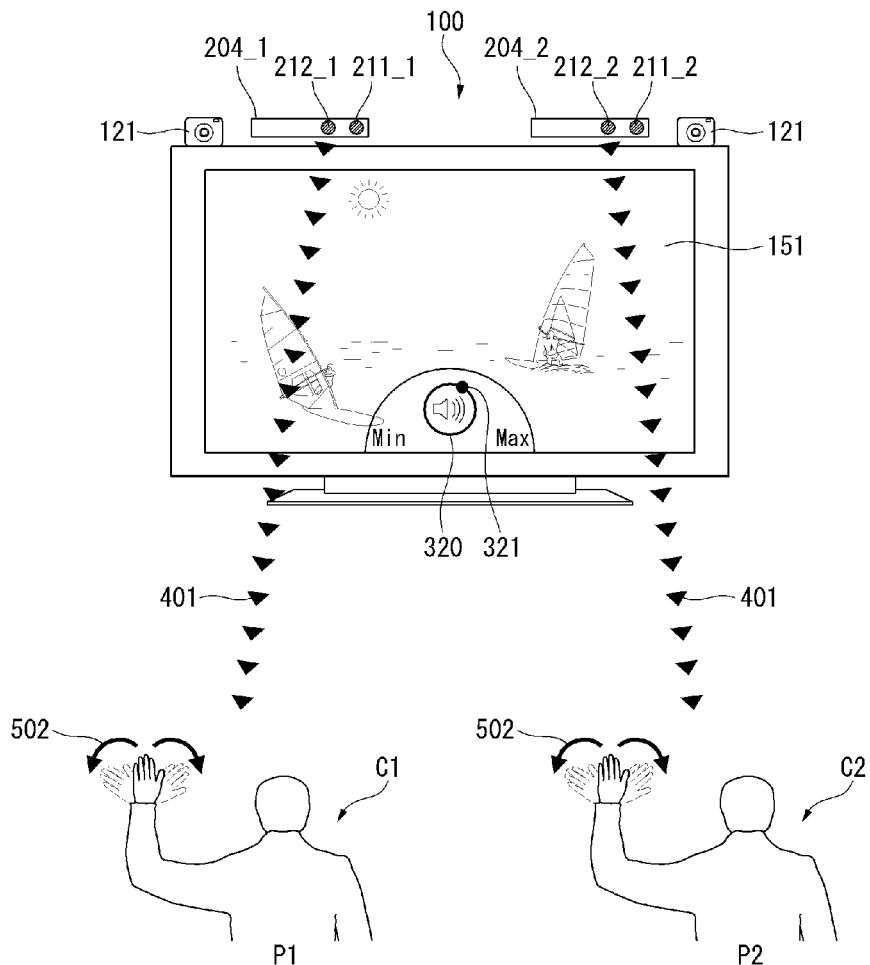
FIG. 23 is a diagram illustrating another example of providing gesture feedback through a directional speaker.

FIG. 23 is a diagram illustrating another example of providing gesture feedback through a directional speaker.

The sound output unit 152 of the image display device 100 comprises two directional speakers 204_1 and 204_2. Therefore, when two control persons exist, different feedback sound can be output in directions of each control person.

Referring to FIG. 23, when a plurality of control persons exist, for a first control person existing at the first position P1, by controlling an output direction of the first directional speaker 204_1 to the first control person, feedback sound can be output, and for a second control person existing at the second position P2, by controlling an output direction of the second directional speaker 204_2 to the second control person, feedback sound can be output.

In FIG. 23, it is assumed that two directional speakers exist, but when one directional speaker exists, for the first control person's gesture, the controller 180 adjusts a sound output direction of a directional speaker toward the first control person and then when the second control person' gesture occurs, the controller 180 adjusts a sound output direction of a directional speaker toward the second control person.

Figure 24:
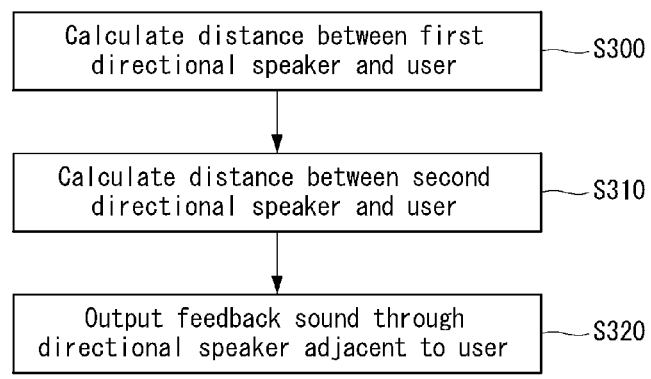
FIG. 24 is a flowchart illustrating a method of providing gesture feedback using an image display device according to an implementation of this document.

FIG. 24 is a flowchart illustrating a method of providing gesture feedback using an image display device according to an implementation of this document.

At least one directional speaker interlocked with the image display device 100 may exist. The at least one directional speaker may be integrally formed with the image display device 100, but may be manufactured in a separated type to install in space separated by a predetermined distance from the image display device 100. For example, the at least one directional speaker may be installed at the ceiling of space at which the user is positioned.

Referring to FIG. 24, when a plurality of directional speakers exist, the controller 180 calculates a distance between the first directional speaker and a user (S300), and calculates a distance between the second directional speaker and the user (S310). The controller 180 compares the two distances and outputs feedback sound through a directional speaker adjacent to the user (S320).

Figure 25:
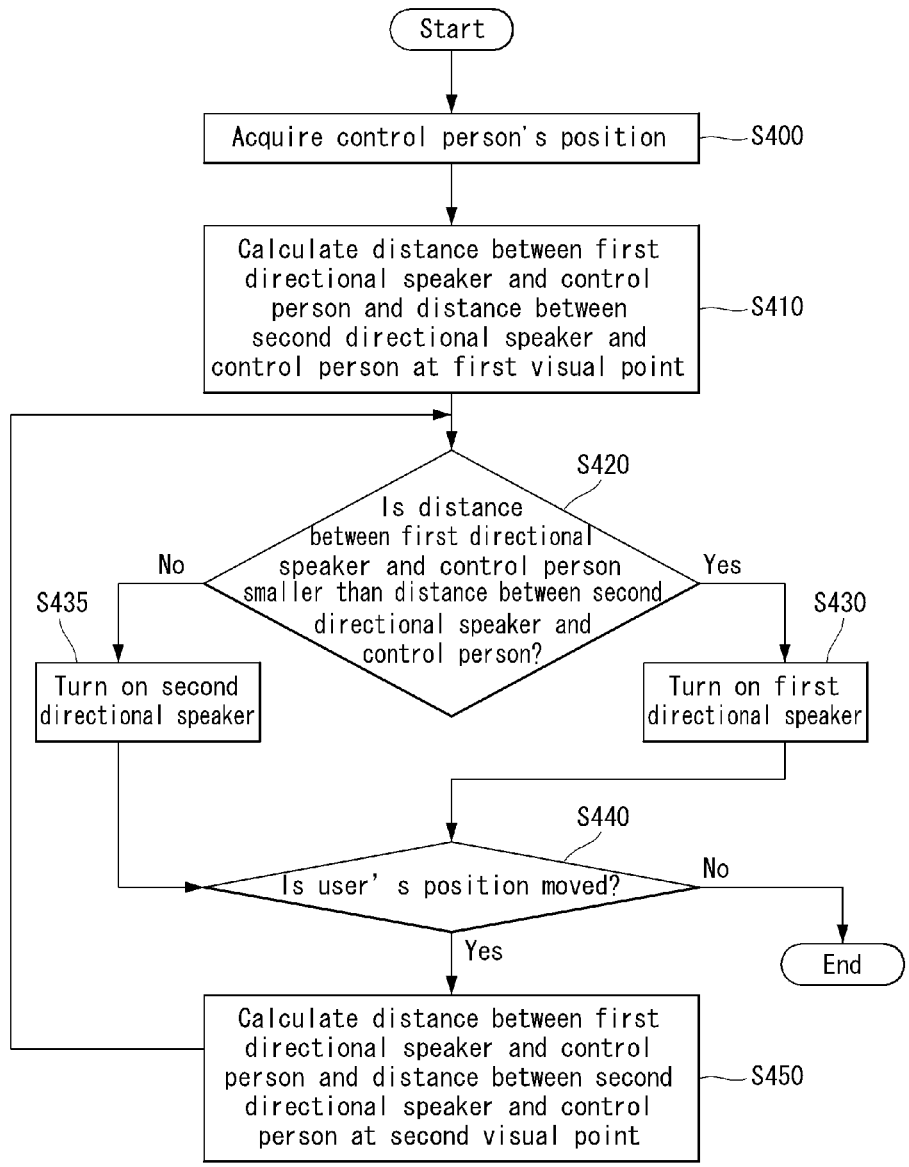
FIG. 25 is a flowchart illustrating the method of providing gesture feedback of FIG. 24.

FIG. 25 is a flowchart illustrating the method of providing gesture feedback of FIG. 24.

Referring to FIG. 25, when the user acquires a control right and takes a predetermined gesture at a specific position, the controller 180 acquires the control person's position (S400). The control person's position can be acquired through a camera.

The controller 180 calculates a distance between a first directional speaker and the control person and a distance between a second directional speaker and the control person at a first visual point (S410).

The first visual point may be any visual point before the control person moves a position. Further, the first visual point may be a visual point before deviating a directional range of the first directional speaker as the control person moves a position.

The controller 180 determines whether a distance between the first directional speaker and the control person is smaller than a distance between the second directional speaker and the control person (S420). If a distance between the first directional speaker and the control person is smaller than a distance between the second directional speaker and the control person, the controller 180 turns on the first directional speaker and outputs feedback sound through the first directional speaker (S430). If a distance between the first directional speaker and the control person is not smaller than a distance between the second directional speaker and the control person, the controller 180 turns on the second directional speaker and outputs feedback sound through the second directional speaker (S435).

While outputting feedback sound through the first directional speaker or the second directional speaker, the controller 180 determines whether the user's position is moved (S440). If the user's position is moved, the controller 180 calculates a distance between the first directional speaker and the control person and a distance between the second directional speaker and the control person at a second visual point (S450). Here, the second visual point may be any visual point after the control person exists within a directional range of the second directional speaker as the control person moves a position.

Figure 26:
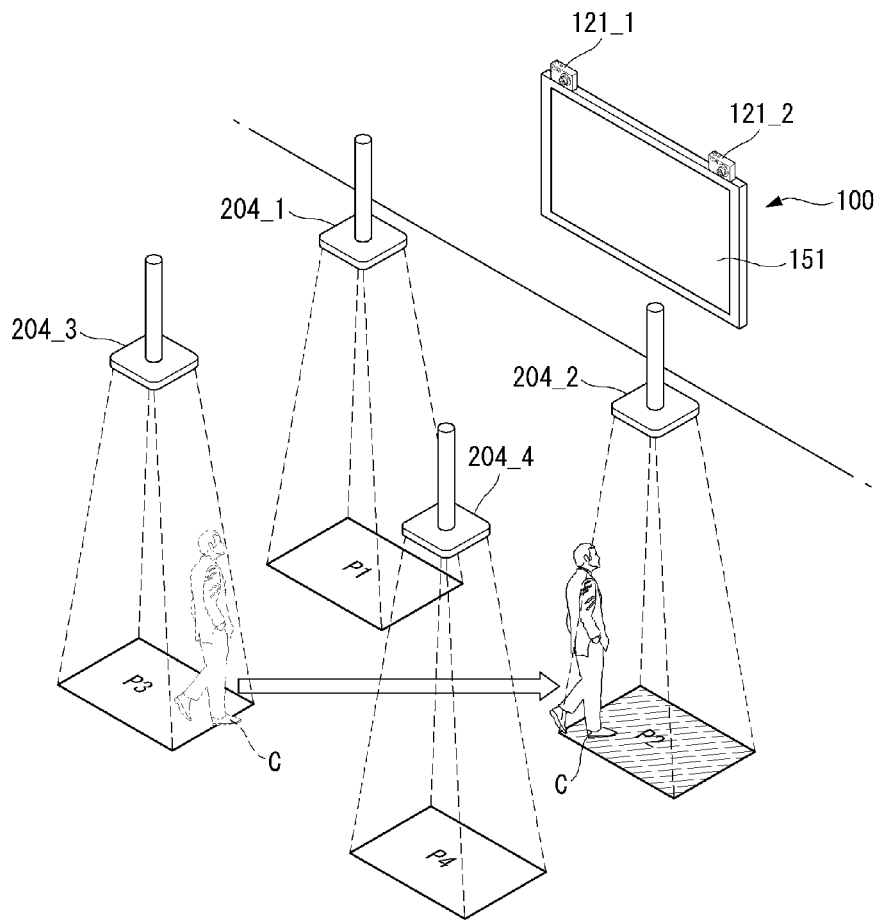
FIG. 26 is a flowchart illustrating the method of providing gesture feedback of FIG. 25.

FIG. 26 is a flowchart illustrating the method of providing gesture feedback of FIG. 25.

Referring to FIG. 26, a plurality of speakers 204_1, 204_2, 204_3, and 204_4 exist, and may be installed in the ceiling to output feedback sound on the user's head. The speakers may be a directional speaker. Alternatively, some speakers may be a directional speaker, and the remaining speakers may be a non-directional speaker.

An area that can hear sound that is output from the first directional speaker 204_1 may be an area P1. An area that can hear sound that is output from the second directional speaker 204_2 is limited to an area P2, and directional ranges of the remaining third and fourth directional speakers 204_3 and 204_4 are limited to areas P3 and P4, respectively.

When the camera 121 recognizes the control person's position, the controller 180 outputs feedback sound through a directional speaker corresponding to the recognized position of the control person.

When the control person moves from a position P3 to a position P4, the controller 180 outputs feedback sound through the fourth directional speaker 204_4.

Therefore, when a plurality of directional speakers exist, by turning on a directional speaker corresponding to a position of the control person rather than adjusting a directional direction of a directional speaker, feedback sound for the control person's gesture can be conveniently transmitted to the control person.

In this case, the controller 180 turns off the remaining directional speakers other than a directional speaker corresponding to the control person's position. That is, when the control person moves, by turning on only one directional speaker to output feedback sound according to the moving direction and by turning off the remaining directional speakers, consumption power of the directional speaker can be reduced.

Here, a range that can be covered by each directional speaker can be predefined by the user.

The directional speakers 204_1, 204_2, 204_3, and 204_4 shown in FIG. 26 can adjust a sound output direction, as describe above. A sound output direction can be adjusted in a specific direction in a software method, or can be physically adjusted through a motor that can be provided in a directional speaker. Therefore, when a control person takes a predetermined gesture at a periphery of a specific area as well as when a control person exists within ranges of specific areas P1 to P4 shown in FIG. 26, the control person can receive feedback sound for the gesture.

The speakers 204_1, 204_2, 204_3, and 204_4 shown in FIG. 26 may be a non-directional speaker.

Further, the directional speakers 204_1, 204_2, 204_3, and 204_4 shown in FIG. 26 can adjust a sound output direction, as describe above. A sound output direction can be adjusted in a specific direction in a software method, or can be physically adjusted through a motor that can be provided in a directional speaker. Therefore, when a control person takes a predetermined gesture at a periphery of a specific area as well as when a control person exists within a range of specific areas P1 to P4 shown in FIG. 26, the control person can receive feedback sound for the gesture.

In the following description, a method of providing the feedback using a visual medium or an auditory medium as a feedback providing means corresponding to a control person's gesture has been described. Hereinafter, a method of providing the feedback by a tactile sense in which the control person can feel will be described.

Figure 27:
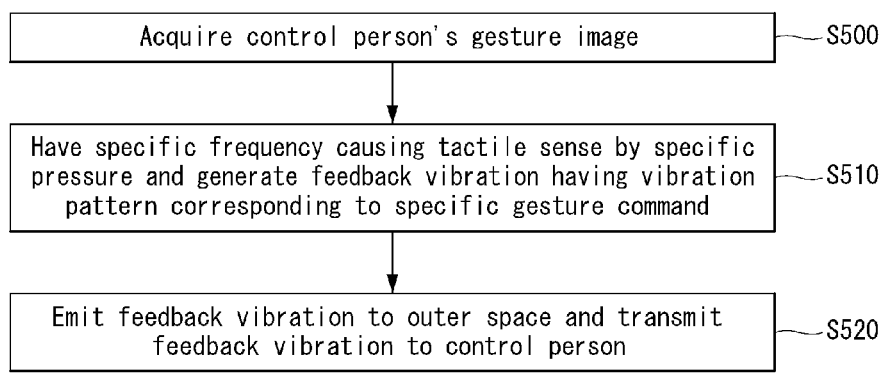
FIG. 27 is a flowchart illustrating a method of transmitting feedback of an image display device according to an implementation of this document.

FIG. 27 is a flowchart illustrating a method of transmitting feedback of an image display device according to an implementation of this document.

According to an implementation, as a feedback transmission means of a gesture, a method of using a tactile sense in addition to the above-described auditory method can be used.

Referring to FIG. 27, the image display device 100 acquires a control person's gesture image through the camera 121 (S500). Further, the control person's position can be recognized through the acquired gesture image.

The vibration module 153 of the image display device 100 has a specific frequency causing a tactile sense by a specific pressure and generates a feedback vibration having a vibration pattern corresponding to a specific gesture command (S510). Here, the specific frequency may be ultrasonic waves. Further, the vibration pattern may be a vibration pattern of the ultrasonic waves.

The controller 180 recognizes a gesture command corresponding to a gesture that is input by the control person, emits a feedback vibration corresponding to the gesture command to outer space, and transmits the feedback vibration to the control person (S520). When the ultrasonic waves are transmitted to a specific body portion of the control person using outer space as a medium due to characteristics having a specific pressure, the control person can feel predetermined trembling due to a pressure of supersonic waves as a tactile sense.

A vibration pattern corresponding to the gesture command can be stored in the memory 160, as shown in FIG. 8, and a vibration pattern corresponding to each gesture command can be predefined by the user.

Figure 28:
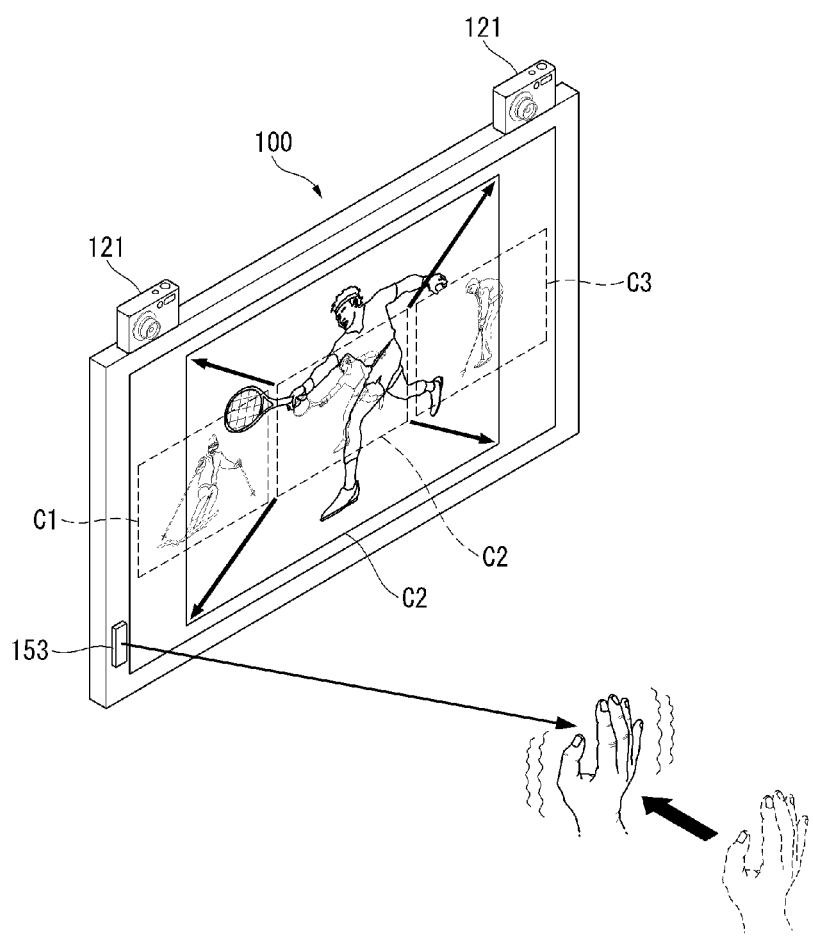
FIG. 28 is a diagram illustrating the method of providing gesture feedback of FIG. 27.

FIG. 28 is a diagram illustrating the method of providing gesture feedback of FIG. 27.

Referring to FIG. 28, it is assumed that a control person takes a gesture of pushing a hand to the front in order to execute a gesture command related to reproduction of a specific program toward the television of the front. When a plurality of contents C1, C2, and C3 are provided in the display unit 151, if the control person takes a pushing gesture of selecting the content C2, the controller 180 can notify the user that the gesture is recognized through visual feedback and auditory feedback with respect to the pushing gesture.

The controller 180 can display the selected content C2 through the entire display unit 151. Further, the controller 180 emits a vibration having a specific vibration pattern to outside air through the vibration module 153, and transmits the vibration to the user's hand using the air as an intermediary. The user detects trembling of a specific pattern due to a specific pressure of the vibration, thereby receiving feedback in which a gesture is recognized.

In the following description, implementations in which the control person receives predetermined gesture feedback through a visual sense, an auditory sense, and a tactile sense and in which the feedback is provided to only the control person have been described. With respect to a means of transmitting the feedback, this document is not limited to a visual sense, an auditory sense, or a tactile sense and can be provided in various sense forms.

The above-described method of controlling an image display device may be written as computer programs and may be implemented in digital microprocessors that execute the programs using a computer readable recording medium. The method of controlling an image display device may be executed through software. The software may comprise code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may comprise ROM, RAM, CD-ROM, DVD-ROM, DVD-RAM, magnetic tapes, floppy disks, and optical data storage devices. The computer readable recording medium may also be distributed over network coupled computer systems so that the computer readable code is stored and executed in a distribution fashion.

A mobile terminal may comprise a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

Any reference in this specification to "one implementation", "an implementation", "example implementation", etc. means that a particular feature, structure, or characteristic described in connection with the implementation is comprised in at least an implementation of the invention. The appearances of such phrases in various places in the specification are not necessarily all referring to the same implementation. Further, when a particular feature, structure, or characteristic is described in connection with any implementation, it is submitted that it is within the purview of one skilled in the art to effect such feature, structure, or characteristic in connection with other ones of the implementations.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An image display device comprising:
    a speaker comprising a directional speaker and a non-directional speaker;
    a camera for photographing a user's gesture and for acquiring a gesture image; and
    a controller for recognizing the user's position from the acquired gesture image and for outputting sound of the speaker to the user's position,
    wherein the controller recognizes a gesture command corresponding to the gesture image based on the gesture image acquired through the camera and outputs feedback sound corresponding to the gesture command through one of the directional speaker and the non-directional speaker, and
    wherein the controller outputs the feedback sound through the non-directional speaker when the gesture command corresponding to the user's gesture exists and outputs the feedback sound through the directional speaker by controlling a directional direction of the directional speaker toward the user's position when the gesture command corresponding to the user's gesture does not exist.

2. The image display device of claim 1, further comprising a memory for storing the gesture command corresponding to at least one predefined gesture.

3. The image display device of claim 2, wherein the controller changes a sound output direction of the directional speaker according to a moving direction of the user.

4. The image display device of claim 2, wherein the controller changes a kind of the feedback sound according to a kind of a gesture command corresponding to the user's gesture.

5. The image display device of claim 2, further comprising a display unit for visually displaying feedback corresponding to the user's gesture,
    wherein the controller visually and auditorily provides the feedback, as the user's position is changed.

6. The image display device of claim 5, wherein the controller outputs the feedback sound to the user's position through the directional speaker when the user's position deviates a viewing area while visually providing feedback for the user's gesture through the display unit.

7. The image display device of claim 2, wherein the controller changes a sound output direction of the directional speaker to a position of a user who acquires the control right when a gesture control person is changed.

8. The image display device of claim 2, wherein the directional speaker comprises a first directional speaker and a second directional speaker, and
    the controller outputs feedback sound for a first control person's gesture to the first control person's position through the first directional speaker and outputs feedback sound for a second control person's gesture to the second control person's position through the second directional speaker.

9. The image display device of claim 2, wherein a directional range of the directional speaker is predefined by a user.

10. An image display device comprising:
a non-directional speaker;
a directional speaker; and
a controller for outputting feedback sound corresponding to a user's gesture through any one speaker adjacent to the user among the non-directional speaker and the directional speaker, wherein the controller is configured to:
output the feedback sound through the non-directional speaker when a gesture command corresponding to the user's gesture exists, and
output the feedback sound through the directional speaker by controlling a directional direction of the directional speaker toward the user's position when the gesture command corresponding to the user's gesture does not exist.

11. The image display device of claim 10, wherein
the controller turns on the directional speaker in which the user exists within a directional range and turns on the non-directional speaker in which the user does not exist within the directional range.

12. The image display device of claim 10, further comprising:
a camera; and
a vibration module for emitting a vibration causing a tactile sense by a specific pressure to outer space,
wherein the controller controls the vibration module to transmit a feedback vibration corresponding to the user's gesture acquired through the camera to the user.

13. The image display device of claim 12, wherein the controller changes a pattern of the feedback vibration according to the gesture command related to the user's gesture.

14. The image display device of claim 12, wherein the controller changes an intensity of the feedback vibration according to a distance between the image display device and the user.

15. A method of providing gesture feedback of an image display device, the method comprising:
acquiring a user's gesture image;
recognizing the user's position through the gesture image;
generating feedback sound corresponding to a gesture command based on the acquired gesture image; and
outputting the feedback sound to the user position through one of a directional speaker and a non-directional speaker,
wherein a sound emission direction of the directional speaker is changed according to the user's moving direction, and
wherein the feedback sound is output through the non-directional speaker when the gesture command corresponding to the user's gesture exists and output through the directional speaker with a controlled directional direction of the directional speaker toward the user's position when the gesture command corresponding to the user's gesture does not exist.

16. A method of providing gesture feedback of an image display device, the method comprising:
calculating a distance between a non-directional speaker and a user;
calculating a distance between a directional speaker and the user; and
outputting feedback sound correspond to the user's gesture through any one speaker adjacent to the user among the non-directional speaker and the directional speaker,
wherein the feedback sound is output through the non-directional speaker when a gesture command corresponding to the user's gesture exists and output through the directional speaker with a controlled directional direction of the directional speaker toward the user's position when the gesture command corresponding to the user's gesture does not exist.

* * * * *